United States Patent
Han et al.

(10) Patent No.: US 12,219,525 B2
(45) Date of Patent: Feb. 4, 2025

(54) PAGING COLLISION PROCESSING METHOD AND RELATED APPARATUS

(71) Applicant: Huawei Technologies Co., Ltd., Shenzhen (CN)

(72) Inventors: Feng Han, Shanghai (CN); Tingting Geng, Shanghai (CN); Yinghao Jin, Boulogne Billancourt (FR); Chenchen Yang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 17/845,571

(22) Filed: Jun. 21, 2022

(65) Prior Publication Data

US 2022/0322286 A1 Oct. 6, 2022

Related U.S. Application Data

(63) Continuation of application No. PCT/CN2019/127681, filed on Dec. 23, 2019.

(51) Int. Cl.
*H04W 68/02* (2009.01)
(52) U.S. Cl.
CPC ................. *H04W 68/02* (2013.01)
(58) Field of Classification Search
CPC ....... H04W 68/02; H04W 68/10; Y02D 30/70
See application file for complete search history.

(56) References Cited

U.S. PATENT DOCUMENTS

| 2009/0215472 A1 | 8/2009 | Hsu |
| 2018/0368099 A1 | 12/2018 | Chen et al. |

(Continued)

FOREIGN PATENT DOCUMENTS

| CN | 101521959 A | 9/2009 |
| CN | 109246850 A | 1/2019 |

(Continued)

OTHER PUBLICATIONS

"Solution for Key Issue#2 Paging collision avoidance," SA WG2 Meeting #136, Reno, U.S.A, S2-1911208, Total 4 pages, 3rd Generation Partnership Project, Valbonne, France (Nov. 18-22, 2019).

(Continued)

*Primary Examiner* — Chuong A Ngo
(74) *Attorney, Agent, or Firm* — Leydig, Voit & Mayer, Ltd.

(57) ABSTRACT

A paging collision processing method and a related apparatus are provided. The method includes: upon detecting that a paging occasion in a first camped cell collides with a paging occasion in a second camped cell, a terminal device determines a first paging parameter, and sends a first paging parameter to a first network device corresponding to the first camped cell. The terminal device receives a second paging parameter from the first network device, determines a second paging occasion of a first identity module card in the first camped cell based on the received second paging parameter, and monitors a paging message in the first camped cell on the second paging occasion, which does not overlap a third paging occasion of a second identity module card in the second camped cell in terms of time, thereby avoiding a paging collision that occurs when the terminal device monitors the paging message.

20 Claims, 7 Drawing Sheets

(56) References Cited

U.S. PATENT DOCUMENTS

2020/0396714 A1* 12/2020 Lee .................. H04W 52/0216
2022/0159617 A1* 5/2022 Shih .................... H04W 68/005

FOREIGN PATENT DOCUMENTS

| CN | 110572876 A | 12/2019 |
| --- | --- | --- |
| WO | 2014144363 A2 | 9/2014 |
| WO | 2018161244 A1 | 9/2018 |

OTHER PUBLICATIONS

"Solution for improved paging in MUSIM devices (KI#1,2,3)," SA WG2 Meeting #136, Reno, Nevada, USA, S2-1911673, pp. 1-7, 3rd Generation Partnership Project, Valbonne, France (Nov. 18-22, 2019).

"3rd Generation Partnership Project; Technical Specification Group Radio Access Network; NG-RAN; Architecture description (Release 15)," 3GPP TS 38.401 V15.6.0, pp. 1-46, 3rd Generation Partnership Project, Valbonne, France (Jul. 2019).

"Discussion on Paging Related Issues," SA WG2 Meeting #135, Split, Croatia, S2-1909264, pp. 1-3, 3rd Generation Partnership Project, Valbonne, France (Oct. 14-18, 2019).

"Considerations on multi-SIM study in RAN," 3GPP TSG RAN Meeting #84, Newport Beach, USA, RP-191304, Total 7 pages, 3rd Generation Partnership Project, Valbonne, France (Jun. 3-6, 2019).

"Solution for Paging Reception with PO collision avoidance," SA WG2 Meeting #S2-136, Reno, NV, US, S2-1911942, pp. 1-4, 3rd Generation Partnership Project, Valbonne, France (Nov. 18-22, 2019).

* cited by examiner

CU-CP: centralized unit control plane
CU-UP: centralized unit user plane

PAGING COLLISION PROCESSING METHOD AND RELATED APPARATUS

CROSS-REFERENCE TO RELATED APPLICATIONS

This application is a continuation of International Application No. PCT/CN2019/127681, filed on Dec. 23, 2019, the disclosure of which is hereby incorporated by reference in its entirety.

TECHNICAL FIELD

Embodiments of this application relate to the field of communication technologies, and in particular, to a paging collision processing method and a related apparatus.

BACKGROUND

With development of communication technologies, to save power, a terminal device usually enters an idle state or an inactive state to sleep. In a sleep process of the terminal device, when a paging occasion (PO) of the terminal device arrives, the terminal device wakes up the terminal device to monitor whether a network device pages the terminal device. If the terminal device detects, on the paging occasion, that the network device pages the terminal device, the terminal device switches from the idle state or the inactive state to an active state. If the terminal device does not detect, on the paging occasion, that the network device pages the terminal device, the terminal device continues to maintain a current state.

Currently, it is increasingly popular that a single terminal device (for example, a dual-SIM dual-standby terminal device) carries a plurality of subscriber identity module (subscriber identification module, SIM) cards. For example, one terminal device may be configured to use a SIM card 1 and a SIM card 2. Although the terminal device may use the plurality of SIM cards for communication, many terminal devices (namely, single receiver terminal devices) that each carry a plurality of SIM cards and that are currently on the market each support simultaneous receiving of a message from only one network. Therefore, for the terminal device carrying the plurality of SIM cards (for example, the SIM card 1 and the SIM card 2), because the terminal device may camp on two different cells, if paging occasions of the terminal device in the two camped cells overlap, and the terminal device supports the simultaneous receiving of a message from only one network, the terminal device is quite likely to miss a paging message in the other camped cell when monitoring a paging message in one camped cell. Consequently, a paging collision occurs when the terminal device monitors the paging message.

SUMMARY

Embodiments of this application provide a paging collision processing method and a related apparatus, to avoid a paging collision that occurs when a terminal device monitors a paging message, so that a terminal device carrying a plurality of identity module cards can successfully receive paging messages in two different camped cells.

The following describes this application from different aspects. It should be understood that for the following implementations and beneficial effects of the different aspects, refer to each other.

According to a first aspect, an embodiment of this application provides a paging collision processing method. The method includes: When a terminal device detects that a paging occasion of the terminal device in a first camped cell collides with a paging occasion of the terminal device in a second camped cell (that is, the paging occasions overlap in terms of time), the terminal device may determine a first paging parameter, and may send first information including the first paging parameter to a first network device corresponding to the first camped cell. After receiving the first information, the first network device sends second information including a second paging parameter to the terminal device. The terminal device receives the second information including the second paging parameter, and determines, based on the second paging parameter, a second paging occasion of a first identity module card of the terminal device in the first camped cell. The terminal device monitors a paging message in the first camped cell on the second paging occasion. The second paging occasion does not overlap a third paging occasion of a second identity module card of the terminal device in the second camped cell in terms of time. The first paging parameter is used to determine a first paging occasion of the first identity module card of the terminal device in the first camped cell, and the first paging occasion does not overlap the third paging occasion in terms of time either.

The terminal device in this embodiment of this application actively requests to modify a paging parameter in a camped cell, so that two paging occasions that originally overlap in terms of time are staggered in terms of time, to avoid a paging collision. In this way, a terminal device carrying a plurality of identity module cards can successfully receive paging messages in two different camped cells.

With reference to the first aspect, in a possible implementation, the second paging parameter may be the same as the first paging parameter. The second paging occasion is also the same as the first paging occasion. In this embodiment of this application, a paging parameter reported by the terminal device is the same as a paging parameter returned by the first network device, so that it can be further ensured that no paging collision occurs when the terminal device monitors the paging message.

With reference to the first aspect, in a possible implementation, that the terminal device sends the first information may be specifically: The terminal device sends an RRC message including the first information. The RRC message may be a MSG3 or a MSG5. The MSG3 may be an RRC setup request message, an RRC resume request message, an RRC reestablishment request message, or a newly defined RRC message, for example, an RRC paging information request message. The MSG5 may be an RRC connection setup complete message, an RRC resume complete message, or an RRC reestablishment complete message. The terminal device in this embodiment of this application sends the first information to the first network device via an existing random access message, so that message/signaling overheads in a paging collision processing process can be reduced.

With reference to the first aspect, in a possible implementation, that the terminal device sends the first information may alternatively be specifically: The terminal device sends a MSGA carrying a random access sequence and a MSG3 to the first network device.

With reference to the first aspect, in a possible implementation, before the terminal device sends the RRC message including the first information, the method further includes: The first network device may allocate, to the terminal device, a random access resource that is used by the terminal device to access a network when the terminal device sends the first information, and may broadcast a random access resource indication. The terminal device receives the random access resource indication. The random access resource indication is used to indicate the random access resource, and the random access resource includes one or more random access sequences. The terminal device sends a first random access sequence in the one or more random access sequences. The first random access sequence is used to indicate that the terminal device needs to transmit a paging parameter.

With reference to the first aspect, in a possible implementation, before the terminal device sends the RRC message including the first information, the method further includes: The first network device may allocate, to the terminal device, a random access resource that is used by the terminal device to access a network when the terminal device sends the first information, and may broadcast a random access resource indication. The terminal device receives the random access resource indication. The random access resource indication is used to indicate the random access resource, and the random access resource includes a time-frequency resource. The terminal device sends a second random access sequence on the time-frequency resource. The time-frequency resource is used to indicate that the terminal device needs to transmit a paging parameter.

In this embodiment of this application, the random access resource required for paging is allocated to the terminal device, so that a collision between random access resources can be avoided.

With reference to the first aspect, in a possible implementation, the first information may further include an identity UE_ID of the terminal device. When the first identity module card of the terminal device is in an idle state or an inactive state in the first camped cell, the terminal device sends the UE_ID of the terminal device to the first network device, so that the first network device learns of a UE that initiates uplink information and processes the uplink information.

With reference to the first aspect, in a possible implementation, the first paging parameter and the second paging parameter each may include one or more of the following paging parameters: a paging frame offset PF_offset, a paging occasion index i_s, a paging frame PF, a paging occasion PO, or a total quantity Ns of paging occasions in one paging frame.

According to a second aspect, an embodiment of this application provides another paging collision processing method. The method includes: A terminal device sends first information including a first paging parameter to a first network device corresponding to a first camped cell of the terminal device. The first network device receives the first information of the terminal device, sends second information including a second paging parameter, and sends a paging message on a second paging occasion determined based on the second paging parameter. The second paging parameter may be determined based on the first paging parameter, the second paging parameter is used to determine the second paging occasion of a first identity module card of the terminal device in the first camped cell, and the second paging occasion may not overlap a third paging occasion of a second identity module card of the terminal device in a second camped cell in terms of time. The first paging parameter is used to determine a first paging occasion of the first identity module card of the terminal device in the first camped cell, and the first paging occasion does not overlap the third paging occasion in terms of time either.

After receiving information (namely, the first information) for requesting to modify a paging parameter from the terminal device, the first network device in this embodiment of this application re-determines a paging parameter of the terminal device in a camped cell, so that two paging occasions that originally overlap in terms of time are staggered in terms of time, to avoid a paging collision. In this way, a terminal device carrying a plurality of identity module cards can successfully receive paging messages in two different camped cells.

With reference to the second aspect, in a possible implementation, the second paging parameter may be the same as the first paging parameter. The second paging occasion is also the same as the first paging occasion. In this embodiment of this application, a paging parameter returned by the first network device is the same as a paging parameter reported by the terminal device, so that it can be further ensured that no paging collision occurs when the terminal device monitors a paging message.

With reference to the second aspect, in a possible implementation, that the first network device receives the first information of the terminal device may be specifically: The first network device receives an RRC message including the first information of the terminal device. The RRC message may be a MSG3 or a MSG5. The MSG3 may be an RRC setup request message, an RRC resume request message, an RRC reestablishment request message, or a newly defined RRC message, for example, an RRC paging information request. The MSG5 may be an RRC connection setup complete message, an RRC resume complete message, or an RRC reestablishment complete message.

With reference to the second aspect, in a possible implementation, that the first network device receives the first information of the terminal device may be specifically: The first network device receives a MSGA carrying a random access sequence and a MSG3.

With reference to the second aspect, in a possible implementation, before the first network device receives the RRC message including the first information of the terminal device, the method further includes: The first network device may allocate, to the terminal device, a random access resource that is used by the terminal device to access a network when the terminal device sends the first information, and may broadcast a random access resource indication. The random access resource indication is used to indicate the random access resource, and the random access resource includes one or more random access sequences. The first network device receives a first random access sequence in the one or more random access sequences. The first random access sequence is used to indicate that the terminal device needs to transmit a paging parameter.

With reference to the second aspect, in a possible implementation, before the first network device receives the RRC message including the first information of the terminal device, the method further includes: The first network device may allocate, to the terminal device, a random access resource that is used by the terminal device to access a network when the terminal device sends the first information, and may broadcast a random access resource indication. The random access resource indication is used to indicate the random access resource, and the random access resource includes a time-frequency resource. The first network device receives a second random access sequence on the time-frequency resource. The time-frequency resource is used to indicate that the terminal device needs to transmit a paging parameter.

With reference to the second aspect, in a possible implementation, before the first network device sends the second information including the second paging parameter, the method further includes: The first network device determines the second paging parameter based on the first paging parameter. Optionally, the first network device determines the first paging parameter as the second paging parameter. That is, the first paging parameter is the same as the second paging parameter. In another optional manner, if the first paging parameter includes a plurality of groups of paging parameters, the first network device selects/determines, as the second paging parameter, one group of paging parameters from/in the plurality of groups of paging parameters in the first paging parameter.

With reference to the second aspect, in a possible implementation, before the first network device sends the second information including the second paging parameter, the method further includes: The first network device sends a first message to a second network device. The first message carries the first information. The first network device receives a second message from the second network device. The second message includes the second paging parameter. The first network device may be a DU, and the second network device may be a CU. The first message may be an initial uplink RRC message transfer (Initial UL RRC Message Transfer) message, and the second message may be a paging information update message, a downlink RRC message transfer (DL RRC Message Transfer) message, an F1AP paging message, or another F1AP message.

In this embodiment of this application, a paging collision processing method in a case in which the CU and the DU are split is provided through interaction between the first network device and the second network device.

With reference to the second aspect, in a possible implementation, the first information may further include an identity UE_ID of the terminal device.

With reference to the second aspect, in a possible implementation, the first paging parameter and the second paging parameter each may include one or more of the following paging parameters: a paging frame offset PF_offset, a paging occasion index i_s, a paging frame PF, a paging occasion PO, or a total quantity Ns of paging occasions in one paging frame.

According to a third aspect, an embodiment of this application provides still another paging collision processing method. The method includes: A second network device may receive a first message sent by a first network device. The first message carries first information, and the first information includes a first paging parameter. The second network device may determine a second paging parameter based on the first paging parameter. The second network device sends a second message to the first network device. The second message includes the second paging parameter. The second paging parameter is used to determine a second paging occasion of a first identity module card of a terminal device in a first camped cell, and the second paging occasion may not overlap a third paging occasion of a second identity module card of the terminal device in a second camped cell in terms of time. The first message may be an initial uplink RRC message transfer (Initial UL RRC Message Transfer) message, and the second message may be a paging information update message, a downlink RRC message transfer (DL RRC Message Transfer) message, an F1AP paging message, or another F1AP message.

With reference to the third aspect, in a possible implementation, that the second network device may determine the second paging parameter based on the first paging parameter may be specifically: The second network device determines the first paging parameter as the second paging parameter. That is, the first paging parameter is the same as the second paging parameter. Optionally, if the first paging parameter includes a plurality of groups of paging parameters, the second network device selects/determines, as the second paging parameter, one group of paging parameters from/in the plurality of groups of paging parameters in the first paging parameter.

According to a fourth aspect, an embodiment of this application provides an apparatus. The apparatus may be a terminal device or a chip or a circuit that may be disposed in the terminal device. The apparatus includes units and/or modules configured to perform the paging collision processing method provided in the first aspect and/or any possible implementation of the first aspect. Therefore, beneficial effects (or advantages) of the paging collision processing method provided in the first aspect can also be achieved.

According to a fifth aspect, an embodiment of this application provides an apparatus. The apparatus may be a first network device or a chip or a circuit that may be disposed in the first network device. The apparatus includes units and/or modules configured to perform the paging collision processing method provided in the second aspect and/or any possible implementation of the second aspect. Therefore, beneficial effects (or advantages) of the paging collision processing method provided in the second aspect can also be achieved.

According to a sixth aspect, an embodiment of this application provides an apparatus. The apparatus may be a second network device or a chip or a circuit that may be disposed in the second network device. The apparatus includes units and/or modules configured to perform the paging collision processing method provided in the third aspect and/or any possible implementation of the third aspect. Therefore, beneficial effects (or advantages) of the paging collision processing method provided in the third aspect can also be achieved.

According to a seventh aspect, an embodiment of this application provides a terminal device. The terminal device may include a processor, a transceiver, and a memory. The memory is configured to store a computer program. The transceiver is configured to send and receive various information or messages. The computer program includes program instructions. When the processor runs the program instructions, the terminal device is enabled to perform the paging collision processing method according to any one of the first aspect or the possible implementations of the first aspect. The transceiver may be a radio frequency module in the terminal device, a combination of the radio frequency module and an antenna, or an input/output interface of a chip or a circuit.

According to an eighth aspect, an embodiment of this application provides a network device. The network device is a first network device. The network device may include a processor, a transceiver, and a memory. The memory is configured to store a computer program. The transceiver is configured to send and receive various information or messages. The computer program includes program instructions. When the processor runs the program instructions, the network device is enabled to perform the paging collision processing method according to any one of the second aspect or the possible implementations of the second aspect. The transceiver may be a radio frequency module in the network device, a combination of the radio frequency module and an antenna, or an input/output interface of a chip or a circuit.

According to a ninth aspect, an embodiment of this application provides another network device. The network device is a centralized unit DU. The network device may include a processor, a transceiver, and a memory. The memory is configured to store a computer program. The transceiver is configured to send and receive various information or messages. The computer program includes program instructions. When the processor runs the program instructions, the network device is enabled to perform the paging collision processing method according to any one of the second aspect or the possible implementations of the second aspect. The transceiver may be a radio frequency module in the network device, a combination of the radio frequency module and an antenna, or an input/output interface of a chip or a circuit.

According to a tenth aspect, an embodiment of this application provides still another network device. The network device is a distributed unit CU. The network device may include a processor, a transceiver, and a memory. The memory is configured to store a computer program. The transceiver is configured to send and receive various information or messages. The computer program includes program instructions. When the processor runs the program instructions, the network device is enabled to perform the paging collision processing method according to any one of the third aspect or the possible implementations of the third aspect. The transceiver may be a radio frequency module in the network device, a combination of the radio frequency module and an antenna, or an input/output interface of a chip or a circuit.

According to an eleventh aspect, an embodiment of this application provides a communication system, including a terminal device and a first network device. The terminal device is the apparatus according to the fourth aspect or the terminal device according to the seventh aspect. The first network device is the apparatus according to the fifth aspect or the network device according to the eighth aspect.

According to a twelfth aspect, an embodiment of this application provides another communication system, including a terminal device, a first network device, and a second network device. The terminal device is the apparatus according to the fourth aspect or the terminal device according to the seventh aspect. The first network device is the apparatus according to the fifth aspect or the network device according to the ninth aspect. The second network device is the apparatus according to the sixth aspect or the network device according to the tenth aspect.

According to a thirteenth aspect, an embodiment of this application provides a readable storage medium. The readable storage medium stores instructions. When the instructions are run on a computer, the computer is enabled to perform the paging collision processing method according to any one of the first aspect or the possible implementations of the first aspect.

According to a fourteenth aspect, an embodiment of this application provides another readable storage medium. The readable storage medium stores instructions. When the instructions are run on a computer, the computer is enabled to perform the paging collision processing method according to any one of the second aspect or the possible implementations of the second aspect.

According to a fifteenth aspect, an embodiment of this application provides still another readable storage medium. The readable storage medium stores instructions. When the instructions are run on a computer, the computer is enabled to perform the paging collision processing method according to any one of the third aspect or the possible implementations of the third aspect.

According to a sixteenth aspect, an embodiment of this application provides a program product including instructions. When the program product runs, the paging collision processing method according to any one of the first aspect or the possible implementations of the first aspect is enabled to be performed.

According to a seventeenth aspect, an embodiment of this application provides a program product including instructions. When the program product runs, the paging collision processing method according to any one of the second aspect or the possible implementations of the second aspect is enabled to be performed.

According to an eighteenth aspect, an embodiment of this application provides a program product including instructions. When the program product runs, the paging collision processing method according to any one of the third aspect or the possible implementations of the third aspect is enabled to be performed.

According to a nineteenth aspect, an embodiment of this application provides a chip, including a processor. The processor is configured to read and execute a program stored in a memory, to perform the paging collision processing method provided in one or more of the first aspect to the third aspect or one or more of all the possible implementations of the first aspect, the second aspect, or the third aspect. Optionally, the chip further includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

Embodiments of this application are implemented to avoid the paging collision that occurs when the terminal device monitors the paging message, so that the terminal device carrying the plurality of identity module cards can successfully receive the paging messages in the two different camped cells.

DETAILED DESCRIPTION OF EMBODIMENTS

Figure 1A:
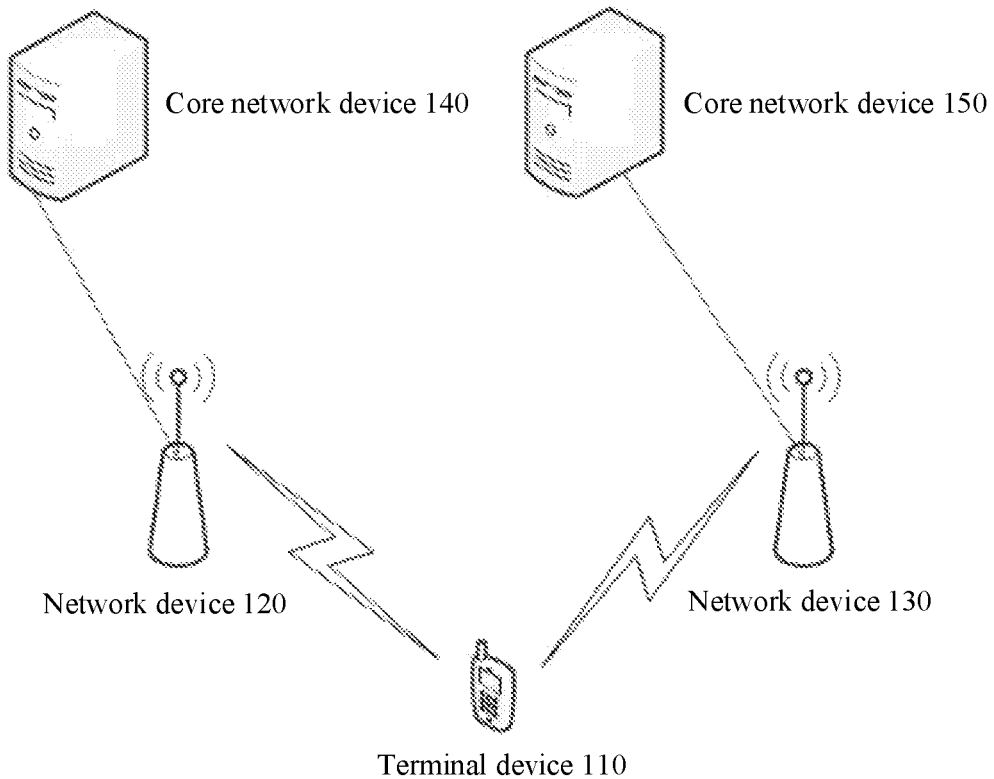
FIG. 1A is a schematic diagram of a system architecture of a mobile communication system according to an embodiment of this application.

The following clearly and completely describes the technical solutions in embodiments of this application with reference to the accompanying drawings in embodiments of this application.

To facilitate understanding of a paging collision processing method provided in embodiments of this application, the following briefly describes some terms (nouns) in the paging collision processing method provided in embodiments of this application.

1. Discontinuous Reception Cycle (DRX Cycle)

In a wireless network, when data needs to be transmitted, a terminal device, for example, a user equipment (UE), needs to monitor a physical downlink control channel (PDCCH) all the time, and sends and receives the data based on an indication message sent by a network side. Consequently, power consumption of the UE and a data transmission delay are increased. Therefore, in the 3rd generation partnership project (3GPP) standard protocol, discontinuous reception (DRX) is introduced into a long term evolution (LTE) system, to reduce the power consumption of the UE. Specifically, in a process in which the UE sleeps in an idle state or an inactive state, the UE may wake up the UE in a specific time unit of the DRX cycle to monitor whether a network device pages the UE, and may sleep in remaining time of the DRX cycle to reduce the power consumption, so that a battery life is prolonged. It may be understood that a UE in the idle state or the inactive state is in a sleep state in most time in the DRX cycle, and wakes up the UE only when the specific time unit of the DRX cycle arrives, to monitor a paging message.

2. Paging Frame (PF) and Paging Occasion (PO)

One DRX cycle may include a plurality of paging frames (PFs). One paging frame PF is one radio frame, and may include one or more paging occasions (POs). The paging occasion PO is a subframe in the paging frame PF. A UE only needs to receive a paging message on a PO in a DRX cycle. A specific time unit in which the UE monitors the paging message is the paging occasion. The paging occasion herein may also be referred to as a paging occasion. A frame number of the PF and a subframe number of the PO may be obtained through calculation by using a paging parameter. The frame number (namely, a system frame number (SFN), to be specific, a number of a frame in which the UE is currently located) of the PF may satisfy Formula (1-1):

$$(SFN+PF\_offset) \bmod T = (T \text{ div } N) * (UE\_ID \bmod N) \quad (1\text{-}1)$$

The paging parameter PF_offset is a paging frame offset, and is indicated by using nAndPagingFrameOffset in a system information block (SIB) 1. The paging parameter T is a discontinuous reception (DRX) cycle value of the UE, and a value of the paging parameter T is a smaller one between a UE specific DRX cycle value and a DRX cycle value broadcast by a cell. The paging parameter N is a total quantity of paging frames in the cycle T, a value of the paging parameter N is 1, 2, 4, 8, or 16, and the paging parameter N is indicated by using the nAndPagingFrameOffset in the SIB1. The UE_ID is 5G-S-TMSI mod 1024, where the 5G-S-TMSI (5G S-Temporary Mobile Subscription Identifier) is a serving-temporary mobile subscriber identity of the UE. mod indicates a remainder operation, and div indicates an exact division operation.

The subframe number (namely, a PO index i_s) of the PO may satisfy Formula (1-2):

$$i\_s = \text{floor}(UE\_ID/N) \bmod Ns \quad (1\text{-}2)$$

The paging parameter i_s is a PO index number corresponding to a PF. To be specific, i_s of a UE indicates that the UE needs to receive a paging message on an $(i\_s+1)^{th}$ PO in the PF. The paging parameter Ns is a total quantity of paging occasions in one paging frame, and a value of the paging parameter Ns may be 4, 2, or 1. Ns is broadcast in the SIB1. floor (x) indicates calculating a largest integer that is less than or equal to x.

3. Message 3 (MSG3) and Message 5 (MSG5)

Contention-based random access includes four messages: a message 1 (MSG1), a message 2 (MSG2), a message 3 (MSG3), and a message 4 (MSG4). The MSG1 refers to the first message sent by a UE to a base station, and a process of sending the MSG1 is a process of sending a preamble sequence. The MSG2 is an acknowledge (ACK) message replied by the base station when the base station receives the MSG1 at a moment. The MSG3 is a radio resource control (RRC) setup or reestablishment request message sent by the UE, for example, an RRC setup request message. The MSG4 refers to an RRC setup or reestablishment command sent by the base station to the UE. The MSG5 is an RRC setup or reestablishment complete message replied by the UE.

4. Message A (MSGA) and Message B (MSGB)

Contention-based random access includes four steps: Step 1: A UE sends a preamble sequence identifying an identity of the UE, to perform uplink synchronization. Step 2: A base station detects the preamble sequence, and sends a random access response after completing sequence detection, and the UE detects the random access response corresponding to the UE, where the random access response includes resource scheduling information used by the UE to perform uplink transmission. Step 3: The UE sends an RRC message. Step 4: The base station sends a contention resolution response. It may be understood that, in the contention-based random access, Step 1 corresponds to a MSG1, Step 2 corresponds to a MSG2, Step 3 corresponds to a MSG3, and Step 4 corresponds to a MSG4. Optionally, Step 1 and Step 3 may be combined into one message for sending, where the message is a MSGA. Step 2 and Step 4 may be combined into another message for sending, where the message is a MSGB.

The foregoing content briefly describes some terms (nouns) in the paging collision processing method provided in embodiments of this application. The following describes a system architecture of the paging collision processing method provided in embodiments of this application.

The paging collision processing method provided in embodiments of this application may be applied to a mobile communication system, for example, a 2nd generation/3rd generation/4th generation/5th generation (2G/3G/4G/5G) mobile communication system or a future mobile communication system. For ease of understanding, a system architecture of the mobile communication system is first briefly described in embodiments of this application.

FIG. 1A is a schematic diagram of a system architecture of a mobile communication system according to an embodiment of this application. As shown in FIG. 1A, the mobile communication system may include at least one terminal device (a terminal device 110 in FIG. 1A) carrying a plurality of identity module cards (for example, SIM cards) and at least one network device (a network device 120 and a network device 130 in FIG. 1A). In this embodiment of this application, the identity module card may also be referred to as an identity module unit, is configured to uniquely identify a terminal device or a terminal user, and may be a card that may be physically separated from the terminal device, may be an embedded SIM (eSIM) card embedded into the terminal device, or may be a soft SIM card or the like. Optionally, the mobile communication system may further include at least one core network device, for example, a core network device 140 and a core network device 150 in FIG. 1A. The terminal device 110 may be connected to the network device 120 and/or the network device 130 in a wireless manner. The terminal device may be located at a fixed position, or may be mobile. The network device 120 may access the core network device 140, and the network device 130 may access the core network device 150. Optionally, the network device 120 and the network device 130 may jointly access one core network device. FIG. 1A is merely a schematic diagram. The mobile communication system may further include another network device, for example, may further include a wireless relay device and/or a wireless backhaul device, which are/is not shown in FIG. 1A. Quantities of terminal devices, network devices, and/or core network devices included in the mobile communication system are not limited in this embodiment of this application.

The terminal device 110 may be an entity, for example, a mobile phone UE, that is configured to receive or transmit a signal on a user side. The terminal device may also be referred to as a terminal Terminal, a UE, a mobile station (MS), a mobile terminal (MT), or the like. The terminal device may be a terminal device that supports a plurality of identity module cards (for example, SIM cards), for example, a mobile phone, a tablet computer (Pad), or a computer with a wireless transceiver function. A specific technology and a specific device form that are used by the terminal device are not limited in embodiments of this application.

In some feasible implementations, the terminal device 110 carrying the plurality of identity module cards may be considered as a plurality of independent users such as UEs. For example, a terminal device carrying two identity module cards may be considered as two independent UEs. The terminal device carrying an identity module card 1 may be considered as a UE 1. The terminal device carrying an identity module card 2 may be considered as a UE 2. The UE 1 and the UE 2 belong to a same physical entity. Optionally, if the identity module card 1 (or the UE 1) of the terminal device 110 camps on a cell managed by the network device 120, the identity module card 1 (or the UE 1) of the terminal device 110 may communicate with the network device 120 in a wireless manner. If the identity module card 2 (or the UE 2) of the terminal device 110 camps on a cell managed by the network device 130, the identity module card 2 (or the UE 2) of the terminal device 110 may communicate with the network device 130 in a wireless manner. It may be understood that, if the terminal device carrying the plurality of identity module cards camps on two different cells, and the two different cells are separately managed by different network devices, the terminal device may separately communicate with network devices in the two cells.

In some feasible implementations, the mobile communication system may be a dual connectivity or multi-connectivity architecture. That is, the terminal device 110 may be connected to one or more network devices. For example, the terminal device 110 may communicate with the network device 120 and the network device 130 by using a dual connectivity (DC) technology.

The network device may be an entity, for example, a gNB, that is configured to transmit or receive a signal on a network side. The network device may alternatively be an access device that connects the terminal device to the mobile communication system in a wireless manner. For example, the network device may be a NodeB NodeB, an evolved NodeB (eNB), a transmission reception point (TRP), a next generation NodeB (gNB) in a 5G mobile communication system, or a base station in a future mobile communication system. A specific technology and a specific device form that are used by the network device are not limited in embodiments of this application.

Figure 1B:
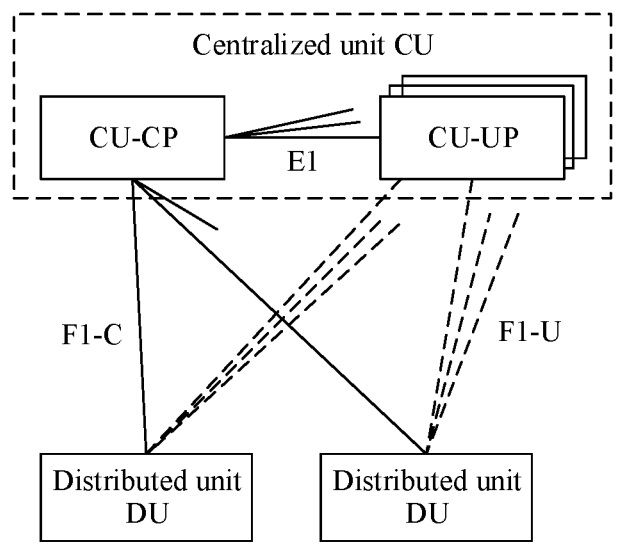
FIG. 1B is a schematic diagram of division of a base station in which a CU and a DU are split according to an embodiment of this application.

Optionally, a base station in embodiments of this application may be a base station (where the base station herein is a gNB) in which a centralized unit (CU) and a distributed unit (DU) are split. FIG. 1B is a schematic diagram of division of a base station in which a CU and a DU are split according to an embodiment of this application. As shown in FIG. 1B, one base station (where the base station herein is a gNB) may include one CU and a plurality of DUs. The CU may be connected to the DU through an F1 interface. FIG. 1B shows only a relationship between one CU and two DUs as an example. The CU may be divided into a centralized unit control plane (CU-control plane, CU-CP) and a centralized unit user plane (CU-user plane, CU-UP). The CU-CP and the CU-UP may be on different physical devices, and the CU-CP may be connected to the CU-UP through an E1 interface. The CU-CP may be connected to the DU through an F1-C interface, and the CU-UP may be connected to the DU through an F1-U interface. One CU-CP may be connected to one or more CU-UPs, and one CU-UP can be connected to only one CU-CP. The CU-CP may include a radio resource control layer (RRC layer) and a packet data convergence protocol (PDCP) control plane. The CU-UP may include a service data adaptation protocol (SDAP) and a PDCP user plane. The DU may include a radio link control layer (RLC layer), a media access control (MAC) layer, and a physical (PHY) layer.

Optionally, as shown in FIG. 1B, one DU can be connected to only one CU-CP, the DU may be connected to one or more CU-UPs under control of a same CU-CP, and one CU-UP may be connected to one or more DUs under control of a same CU-CP. One DU may support one or more cells, and each cell can be supported by only one DU.

A core network device may be a 4G core network device, or may be a 5G core network device. Optionally, the CU may be connected to a 5G core network through an NG interface.

In some feasible implementations, the terminal device and the network device in the mobile communication system may be deployed on land, and include indoor, outdoor, handheld, or vehicle-mounted devices.

The foregoing content describes the system architecture of the paging collision processing method provided in embodiments of this application. The following describes in detail, with reference to paging collision scenarios in this application, the paging collision processing method provided in embodiments of this application.

Terminal devices each carrying a plurality of identity module cards (for example, SIM cards) may be classified into four types of terminal devices based on different transmit and receive capabilities of the terminal devices: a single receiver/single transmitter (single Rx/single Tx) terminal device, a single receiver/dual transmitter (single Rx/dual Tx) terminal device, a dual receiver/single transmitter (dual Rx/single Tx) terminal device, and a dual receiver/dual transmitter (dual Rx/dual Tx) terminal device. When a terminal device supports a single receiver (single Rx) capability, the terminal device cannot receive messages (for example, paging messages) from two networks simultaneously. When a terminal device supports a dual receiver (dual Tx) capability, the terminal device may receive messages (for example, paging messages) from two networks simultaneously. When a terminal device supports a single transmitter (single Tx) capability, the terminal device cannot send messages to two networks simultaneously. When a terminal device supports a dual transmitter (dual Tx) capability, the terminal device may send messages to two networks simultaneously.

Figure 2:
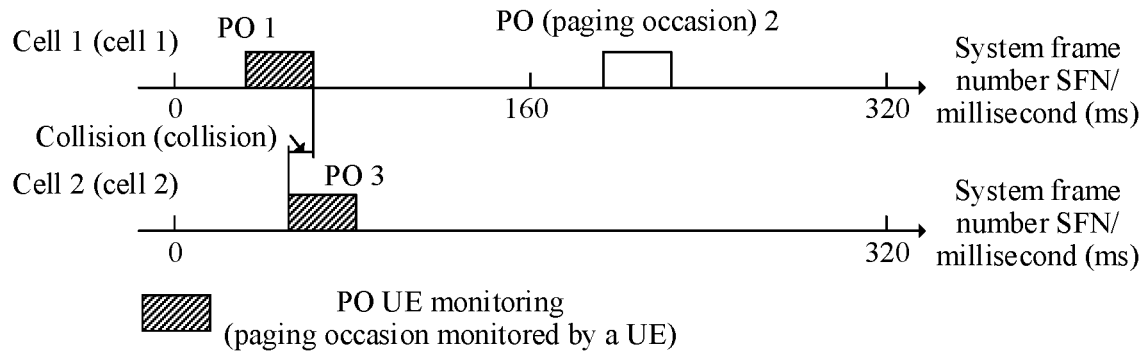
FIG. 2 is a schematic diagram of a paging collision in a mobile communication system.

Because the terminal device may carry the plurality of identity module cards (for example, the SIM cards), the terminal device carrying the plurality of SIM cards may camp on different cells. For example, FIG. 2 is a schematic diagram of a paging collision in a mobile communication system. As shown in FIG. 2, a SIM card 1 of a terminal device camps on a cell 1, and a SIM card 2 of the terminal device camps on a cell 2. Within 320 milliseconds (ms), the cell 1 has two POs: a PO 1 and a PO 2, and the cell 2 has one PO: a PO 3. If the terminal device is a single receiver (including two types: single receiver/single transmitter and single receiver/dual transmitter) terminal device, and the terminal device is configured to receive paging messages on the PO 1 and the PO 3, because the PO 1 overlaps the PO 3 in terms of time, the terminal device is quite likely to miss a paging message on the PO 3 when monitoring whether there is a paging message on the PO 1. That is, a paging collision occurs on the terminal device in this case.

Therefore, embodiments of this application provide a paging collision processing method. When a terminal device separately camps on different cells, and it is found that a paging collision may occur, a paging occasion is indirectly modified by modifying a paging parameter of the terminal device in a camped cell, to avoid a paging collision of the terminal device in two different camped cells, so that the terminal device carrying a plurality of identity module cards can successfully receive paging messages in the two different camped cells.

It may be understood that the terminal device in embodiments of this application may carry the plurality of identity module cards. For ease of description, an example in which the terminal device carries two identity module cards is used for description below: Because the terminal device carrying the two identity module cards may be considered as two different UEs, the two different UEs may respectively have UE_IDs of the two different UEs. For example, a UE_ID of a UE 1 (where the UE 1 herein is a UE carrying an identity module card 1) is 146, and a UE_ID of a UE 2 (where the UE 2 herein is a UE carrying an identity module card 2) is 147. That is, the terminal device carrying the two identity module cards has the two different UE_IDs. Optionally, the two different UEs may respectively camp on different cells. For example, the UE 1 (where the UE 1 herein is the UE carrying the identity module card 1) camps on a cell 1, and the UE 2 (where the UE 2 herein is the UE carrying the identity module card 2) camps on a cell 2. The UE 1 and the UE 2 belong to a same physical entity. For ease of description, an example in which a first identity module card (or the UE 1) of the terminal device camps on a first camped cell and a second identity module card (or the UE 2) of the terminal device camps on a second camped cell is used for description below.

It may be further understood that the terminal device in embodiments of this application is a terminal device that supports a single receiver capability. That is, the terminal device in embodiments of this application cannot receive paging messages from two networks/cells simultaneously.

Figure 3:
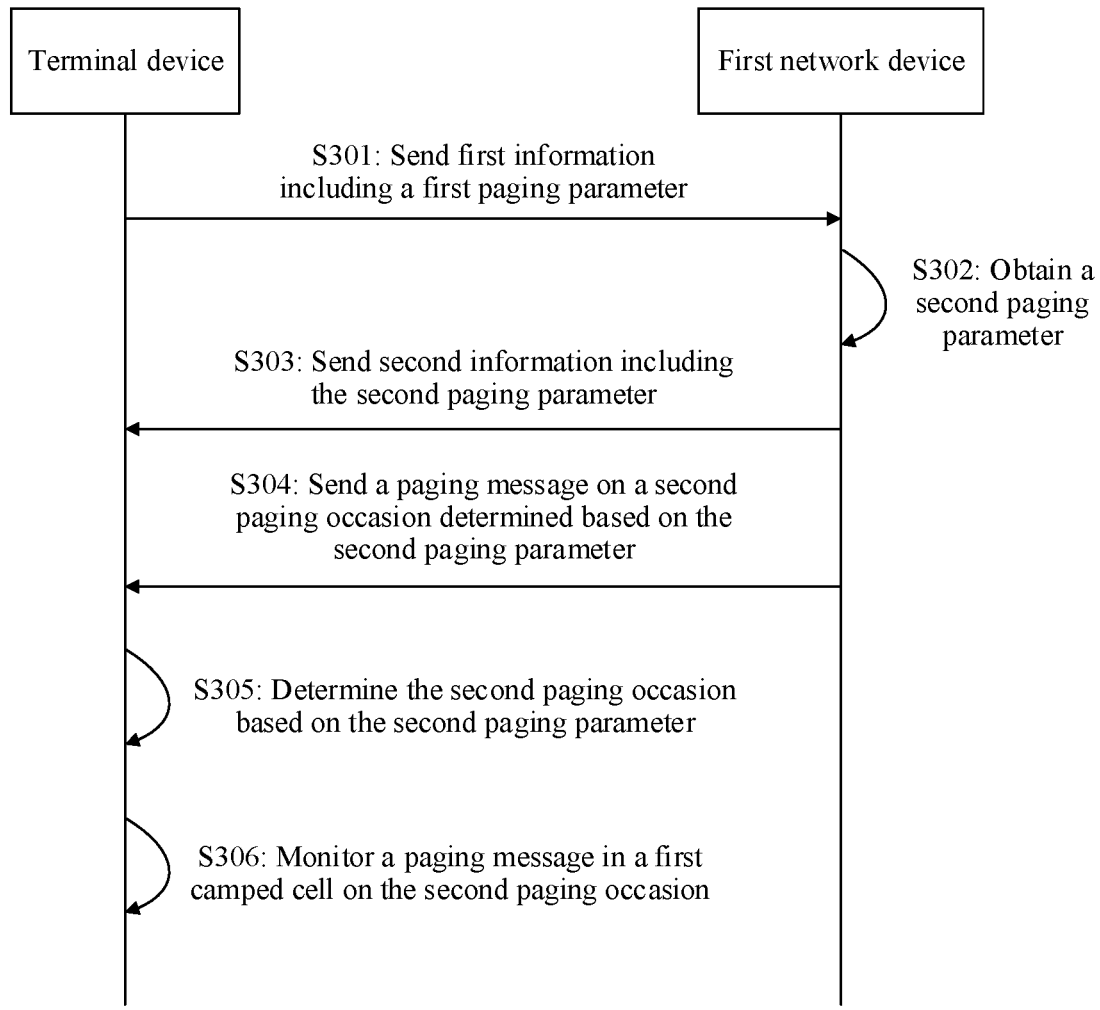
FIG. 3 is a schematic flowchart of a paging collision processing method according to an embodiment of this application.

FIG. 3 is a schematic flowchart of a paging collision processing method according to an embodiment of this application. As shown in FIG. 3, the paging collision processing method provided in this embodiment of this application includes but is not limited to the following steps.

S301: A terminal device sends first information including a first paging parameter. Correspondingly, a first network device receives the first information.

In some feasible implementations, the first information may include the first paging parameter. The first paging parameter may include one or more of a paging frame offset PF_offset, a paging occasion index i_s, a paging frame PF, a paging occasion PO, a total quantity Ns of paging occasions in one paging frame, a DRX cycle value T of the terminal device, or a total quantity N of paging frames in the cycle T. In another embodiment, when Ns is greater than 1, the first paging parameter may include a paging occasion index i_s. In another embodiment, the first paging parameter may include a recommended DRX cycle value broadcast by a cell. It should be noted that, when the terminal device receives a DRX cycle value of a network device (for example, a base station), a value of T of the terminal device is a smaller one between a UE specific DRX cycle value and the DRX cycle value transferred to the terminal device. In another embodiment, the first paging parameter may include a discontinuous reception (DRX) cycle value of a UE, and a value of the DRX cycle value is a UE specific DRX cycle value. The first paging parameter may be an expected paging parameter of a first identity module card of the terminal device in a first camped cell. There is no paging collision between a paging occasion (namely, a first paging occasion) that is determined based on the first paging parameter and that is of the first identity module card of the terminal device in the first camped cell and a third paging occasion of a second identity module card of the terminal device in a second camped cell. That is, the two paging occasions do not overlap in terms of time.

In some feasible implementations, a network device may periodically broadcast paging parameters in cells (where the cells herein are cells managed by the network device). The paging parameters broadcast by the network device each may include one or more of a paging frame offset PF_offset, a DRX cycle value T of the terminal device, a total quantity N of paging frames in the cycle T, and/or a total quantity Ns of paging occasions in one paging frame. Correspondingly, the terminal device receives a paging parameter in a cell on which the terminal device camps. Optionally, when an identity module card of the terminal device is in an idle state or an inactive state in the cell on which the identity module card camps, the terminal device receives the paging parameter broadcast in the camped cell. It may be understood that, when the identity module card of the terminal device is in a connected state in the cell on which the terminal device camps, the terminal device may also receive the paging parameter broadcast in the camped cell, where the paging parameter is used to modify system information.

For ease of description, descriptions are provided below by using, as a fourth paging parameter, a paging parameter that is in a first camped cell (where the first camped cell herein is a cell on which a first identity module card of the terminal device camps) and that is broadcast by the network device and received by the terminal device, and using, as a third paging parameter, a paging parameter that is in a second camped cell (where the second camped cell herein is a cell on which a second identity module card of the terminal device camps) and that is broadcast by the network device and received by the terminal device. After receiving the fourth paging parameter, the terminal device may determine, based on the fourth paging parameter, a fourth paging occasion of the first identity module card of the terminal device in the first camped cell. For example, the terminal device calculates the fourth paging occasion of the first identity module card of the terminal device in the first camped cell based on the fourth paging parameter and according to Formula (1-1) and Formula (1-2). Similarly, the terminal device may further determine a third paging occasion of the second identity module card of the terminal device in the second camped cell based on the received third paging parameter. The terminal device may detect whether the fourth paging occasion overlaps the third paging occasion in terms of time. If the fourth paging occasion does not overlap the third paging occasion in terms of time, it indicates that no paging collision occurs when the terminal device monitors a paging message. In this case, the terminal device monitors a paging message in the first camped cell on the fourth paging occasion, and monitors a paging message in the second camped cell on the third paging occasion. It may be understood that the third paging parameter and the fourth paging parameter each include one or more of the paging frame offset PF_offset, the DRX cycle value T of the terminal device, the total quantity N of paging frames in the cycle T, or the total quantity Ns of paging occasions in the paging frame.

If the fourth paging occasion overlaps the third paging occasion in terms of time, it indicates that a paging collision may occur when the terminal device monitors a paging message. In this case, the terminal device may determine, based on the fourth paging occasion and the third paging occasion, an expected paging parameter in either of the first camped cell and the second camped cell. For ease of description, descriptions are provided below by using an example in which the terminal device determines an expected paging parameter (namely, the first paging parameter) in the first camped cell. The terminal device may send the first information including the first paging parameter to the first network device corresponding to the first camped cell. Correspondingly, the first network device receives the first information. The first information may be used to request the first network device to modify a paging parameter of the terminal device in the first camped cell from the fourth paging parameter to the first paging parameter. The first paging parameter may be used to determine a first paging occasion of the first identity module card of the terminal device in the first camped cell. The first paging occasion does not overlap the third paging occasion in terms of time. It indicates that if the terminal device monitors a paging message in the first camped cell on the first paging occasion, and monitors a paging message in the second camped cell on the third paging occasion, no paging collision occurs.

Optionally, the first paging occasion does not overlap the third paging occasion in terms of time, and a time interval between the first paging occasion and the third paging occasion is less than a target value. The target value may be a predefined value. The target value may be used to reflect that the time interval between the first paging occasion and the third paging occasion is as small as possible, but the first paging occasion does not overlap the third paging occasion in terms of time, that is, the time interval is greater than 0). For example, assuming that the first paging occasion is earlier than the third paging occasion, the time interval between the first paging occasion and the third paging occasion is defined as a difference between a start moment of the third paging occasion and an end moment of the first paging occasion. For example, assuming that the first paging occasion is earlier than the third paging occasion, the time interval between the first paging occasion and the third paging occasion is defined as a difference between a start moment of the third paging occasion and a start moment of the first paging occasion. The terminal device in this embodiment of this application makes the first paging occasion close to the third paging occasion as much as possible on a premise of ensuring that no paging collision occurs, so that the terminal device monitors paging messages in two camped cells when the terminal device is woken up once, to reduce a quantity of times the terminal device is woken up, and then reduce power consumption of the terminal device.

Figure 4A:
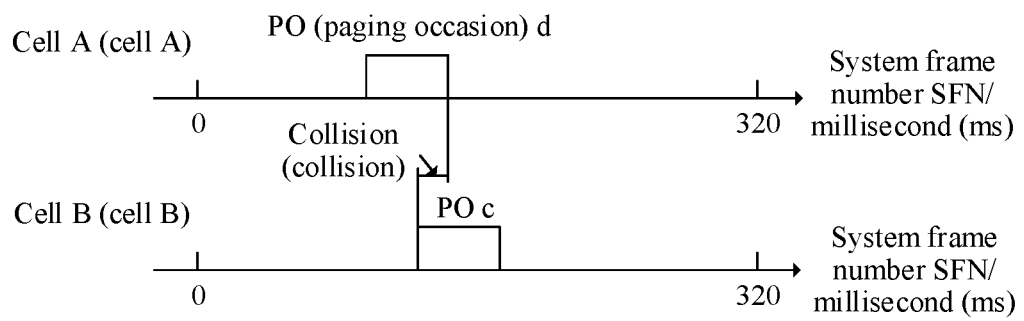
FIG. 4a and FIG. 4b are respectively a schematic diagram of a relationship between a third paging occasion and a fourth paging occasion and a schematic diagram of a relationship between a first paging occasion and the third paging occasion according to an embodiment of this application.
Figure 4B:
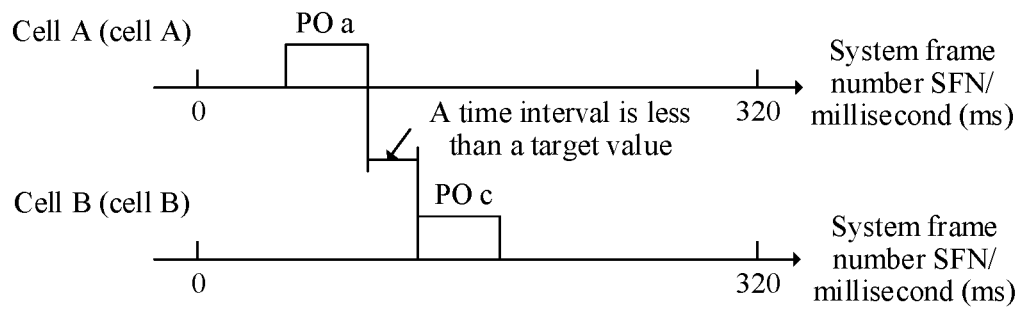

For example, FIG. 4a and FIG. 4b are respectively a schematic diagram of a relationship between the third paging occasion and the fourth paging occasion and a schematic diagram of a relationship between the first paging occasion and the third paging occasion according to an embodiment of this application. As shown in FIG. 4a and FIG. 4b, the first camped cell is a cell A, and the second camped cell is a cell B. The first paging occasion is a PO a, the third paging occasion is a PO c, and the fourth paging occasion is a PO d. As shown in FIG. 4a, the fourth paging occasion PO d overlaps or collides with the third paging occasion PO c in terms of time. As shown in FIG. 4b, the first paging occasion PO a does not overlap or collide with the third paging occasion PO c in terms of time, and a time interval between the PO a and the PO c is less than the target value.

In some feasible implementations, if the first identity module card of the terminal device is in the idle state or the inactive state in the first camped cell, and the second identity module card is also in the idle state or the inactive state in the second camped cell, the terminal device may send, via an RRC message, the first information to the first network device corresponding to the first camped cell. Correspondingly, the first network device receives the RRC message including the first information. The RRC message may be a MSG3 or a MSG5. The MSG3 may be an RRC setup request message, an RRC resume request message, an RRC reestablishment request message, or a newly defined RRC message, for example, an RRC paging information request (RRC Paging Information Request) message. The MSG5 may be an RRC connection setup complete message, an RRC resume complete message, or an RRC reestablishment complete message. Because the first identity module card of the terminal device is in the idle state or the inactive state in the first camped cell, the first information may further include an identity UE_ID of the terminal device. The identity of the terminal device included in the first information is an identity of the first identity module card (namely, a UE 1) of the terminal device. The identity UE_ID of the terminal device may be a serving-temporary mobile subscriber identity 5G-S-TMSI of the UE, 5G-S-TMSI mod 1024, or an inactive-radio network temporary identity (I-RNTI). The I-RNTI is a temporary ID of the UE in the inactive state.

Optionally, before the terminal device sends, via the RRC message, the first information to the first network device corresponding to the first camped cell, the first network device may allocate, to the terminal device, a random access resource that is used by the terminal device to access a network when the terminal device sends the first information, and may broadcast a random access resource indication. For example, the first network device may allocate an appropriate size of the MSG3 and/or a time-frequency resource based on the random access resource that is used by the terminal device to access the network, to allow the terminal device to send the MSG3 including the first information. For example, the random access resource may be different from a random access resource that is used by the terminal device to access the network in another case, so that a mutual collision is avoided, and a case in which the terminal device cannot send the first information during network congestion is greatly avoided. Correspondingly, the terminal device receives the random access resource indication. The random access resource indication is used to indicate the random access resource that is used by the terminal device to access the network when the terminal device sends the first information. The random access resource may include one or more random access sequences (where the random access sequence herein is a preamble sequence) and/or a time-frequency resource. For example, the random access resource indication is used to indicate a random access resource for an on demand paging parameters change request (on demand paging parameters change request). The random access resource for the on demand paging parameters change request may include one or more random access sequences (where the random access sequence herein is a preamble sequence) and/or a time-frequency resource.

When the fourth paging occasion overlaps the third paging occasion in terms of time, it indicates that the paging collision may occur when the terminal device monitors the paging message. The terminal device sends a first random access sequence in the one or more random access sequences to the first network device. The first random access sequence may be used to indicate that the terminal device needs to transmit a paging parameter. Alternatively, in another embodiment, the terminal device sends a second random access sequence to the first network device on the time-frequency resource. The time-frequency resource is used to indicate that the terminal device needs to transmit a paging parameter. Optionally, the second random access sequence may be any random access sequence. Alternatively, in still another embodiment, the terminal device sends a first random access sequence in the one or more random access sequences to the first network device on the time-frequency resource. Both the first random access sequence and the time-frequency resource may be used to indicate that the terminal device needs to transmit a paging parameter. After sending the random access sequence (the first random access sequence or the second random access sequence) to the first network device, the terminal device may send the first information to the first network device via the MSG3.

The random access resource for the on demand paging parameters change request may be different from a random access resource for on demand system information. For example, the first random access sequence in the one or more random access sequences is different from a random access sequence in the random access resource for the on demand system information, and/or the time-frequency resource in the random access resource for the on demand paging parameters change request is different from a time-frequency resource in the random access resource for the on demand system information. In this embodiment of this application, the random access resource required for paging is allocated to the terminal device, so that a collision between random access resources can be avoided.

Optionally, after sending the random access sequence (the first random access sequence or the second random access sequence) to the first network device, the terminal device may send, to the first network device, an RRC connection request message (for example, an RRC connection request message) for random access. Correspondingly, after receiving the RRC connection request message, the first network device returns, to the terminal device, an RRC connection setup message (for example, an RRC connection setup message) for random access. Correspondingly, after the terminal device receives the RRC connection setup message, the terminal device sends the first information to the first network device via the RRC connection setup complete message (for example, the RRC connection setup complete message), namely, the MSG5.

Optionally, after receiving the random access resource indication, the terminal device may send, to the first network device, a MSGA carrying the random access sequence (the first random access sequence or the second random access sequence) and the MSG3 (namely, the RRC setup request message or the RRC paging information request message that includes the first information).

In some other feasible implementations, if the first identity module card of the terminal device is in the connected state in the first camped cell, and the second identity module card is in the idle state or the inactive state in the second camped cell, the terminal device sends a request message including the first information to the first network device corresponding to the first camped cell. Correspondingly, the first network device receives the request message including the first information. The request message is used to request to update a paging configuration of a system message of the first network device. The request message may be a newly defined RRC message, for example, an RRC paging information request message. Because the first identity module card of the terminal device is in the connected state in the first camped cell, it indicates that the terminal device has a dedicated channel resource in the first camped cell. In this case, the terminal device may directly send, by using the dedicated channel resource, the request message including the first information, and does not need to send the first information by using an RRC message (where the RRC message herein is a MSG3 and a MSG5) for random access or a MSGA. The first information includes the first paging parameter.

It may be understood that, in this embodiment of this application, for example, the terminal device sends the first information to a network device corresponding to one camped cell. During actual application, the terminal device may separately send the first information to the network device corresponding to the first camped cell, and send third information to a network device corresponding to the second camped cell. The first information may include the first paging parameter, and the third information may include a fifth paging parameter. The first paging parameter may be the expected paging parameter of the first identity module card of the terminal device in the first camped cell, and the fifth paging parameter may be an expected paging parameter of the second identity module card of the terminal device in the second camped cell. The first information may be used to request the network device corresponding to the first camped cell to modify the paging parameter of the terminal device in the first camped cell from the fourth paging parameter to the first paging parameter. The third information may be used to request the network device corresponding to the second camped cell to modify a paging parameter of the terminal device in the second camped cell from the third paging parameter to the fifth paging parameter. The first paging parameter may be used to determine the first paging occasion of the first identity module card of the terminal device in the first camped cell, and the fifth paging parameter may be used to determine a fifth paging occasion of the second identity module card of the terminal device in the second camped cell. The first paging occasion does not overlap the fifth paging occasion in terms of time.

In some feasible implementations, the first camped cell and the second camped cell may belong to cells managed by a same network device, or the first camped cell and the second camped cell may belong to cells managed by different network devices. This is not limited in this embodiment of this application. It may be understood that each network device may periodically broadcast a paging parameter in a cell managed by the network device.

It may be understood that, if the terminal device carrying the first identity module card and the second identity module card is considered as two independent UEs, assuming that a UE carrying the first identity module card is a UE 1, and a UE carrying the second identity module card is a UE 2, the terminal device that sends the first information including the first paging parameter in step S301 may be considered as the UE 1.

S302: The first network device obtains a second paging parameter.

S303: The first network device sends second information including the second paging parameter. Correspondingly, the terminal device receives the second information.

In some feasible implementations, the second information may include the second paging parameter, and the second paging parameter may be determined based on the first paging parameter. The second paging parameter may be used to determine a second paging occasion of the first identity module card of the terminal device in the first camped cell, and the second paging occasion does not overlap the third paging occasion of the second identity module card of the terminal device in the second camped cell in terms of time. The third paging occasion may be determined based on the third paging parameter. The second paging parameter may include one or more of a paging frame offset PF_offset, a paging occasion index i_s, a paging frame PF, a paging occasion PO, a total quantity Ns of paging occasions in one paging frame, a DRX cycle value T of the terminal device, or a total quantity N of paging frames in the cycle T. The second paging parameter may include a paging parameter of a type the same as that of the first paging parameter and/or at least one paging parameter of a type different from that of the first paging parameter. For example, if the first paging parameter includes the paging frame offset, the second paging parameter also includes the paging frame offset; or if the first paging parameter includes the paging frame offset, the second paging parameter includes the paging frame offset and the paging occasion index.

In some feasible implementations, the first network device receives the first information. The first information includes the first paging parameter. That the first network device determines the received first paging parameter as the second paging parameter indicates that the first network device agrees to modify the paging parameter of the terminal device in the first camped cell from the fourth paging parameter to the first paging parameter, and may send the second information to the terminal device. Correspondingly, the terminal device receives the second information. The second information includes the second paging parameter. The second paging parameter is the same as the first paging parameter. The second information is used to acknowledge that the paging parameter of the terminal device in the first camped cell is modified from the fourth paging parameter to the first paging parameter (namely, the second paging parameter).

In some feasible implementations, the first paging parameter may include a plurality of groups of expected paging parameters of the first identity module card of the terminal device in the first camped cell. A paging occasion that is determined based on each group of paging parameters in the first paging parameter and that is of the first identity module card of the terminal device in the first camped cell does not overlap the third paging occasion in terms of time. After receiving the first information including the first paging parameter, the first network device may determine (or select), as the second paging parameter, one group of paging parameters in (or from) the plurality of groups of paging parameters in the first paging parameter. The first network device may send the second information to the terminal device. Correspondingly, the terminal device receives the second information. The second information includes the second paging parameter.

For example, the first paging parameter includes three groups of paging parameters: a paging frame offset 1, a paging frame offset 2, and a paging frame offset 3. After receiving the first information, the first network device selects, as the second paging parameter, the paging frame offset 3 from the first paging parameter included in the first information, and sends the second information including the second paging parameter to the terminal device. In this case, the second paging parameter is the paging frame offset 3.

In some feasible implementations, if the first network device in this embodiment of this application is a DU, the first network device may send the first information to a second network device via a first message after receiving the first information sent by the terminal device. Correspondingly, the second network device receives the first message. The second network device may be a CU. The first message may be an initial uplink RRC message transfer (Initial UL RRC Message Transfer) message. After receiving the first message, the second network device may determine the second paging parameter based on the first paging parameter included in the first information, and may send the second paging parameter to the first network device via a second message. Correspondingly, the first network device receives the second message. The second message may be a paging information update message, a downlink RRC message transfer (DL RRC Message Transfer) message, an F1AP paging message, or another F1AP message. After receiving the second message, the first network device may send the second information including the second paging parameter to the terminal device. Correspondingly, the terminal device receives the second information. Optionally, after receiving the second message, the first network device stores the second paging parameter. The first network device pages the terminal device based on the second paging parameter.

Figure 5:
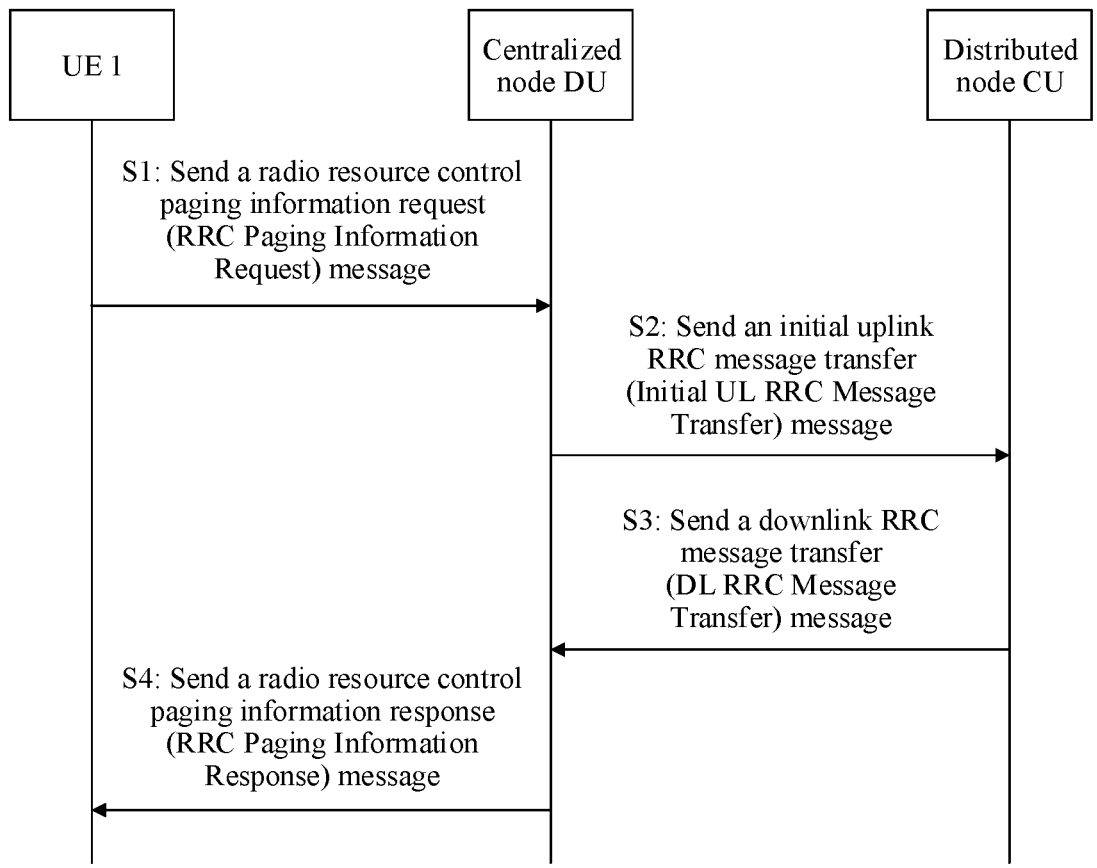
FIG. 5 is a flowchart of interaction between a first network device and a second network device according to an embodiment of this application.

For example, FIG. 5 is a flowchart of interaction between the first network device and the second network device according to an embodiment of this application. As shown in FIG. 5, the first information is included in the RRC paging information request message, and the second information is included in an RRC paging information response message. The first message is the initial uplink RRC message transfer (Initial UL RRC Message Transfer) message, and the second message is the downlink RRC message transfer message (DL RRC Message Transfer message). The first network device is the DU, the second network device is the CU, and the terminal device that sends the first information is the UE 1. As shown in FIG. 5. S1: The UE 1 sends the RRC paging information request message to the DU. S2: The DU sends the initial UL RRC message transfer message to the CU. S3: The CU sends the DL RRC message transfer message to the DU. S4: The DU sends the RRC paging information response message to the UE 1.

Optionally, that the second network device determines the second paging parameter based on the first paging parameter included in the first information may be specifically: The second network device directly determines the received first paging parameter as the second paging parameter. Alternatively, when the first paging parameter includes the plurality of groups of expected paging parameters of the first identity module card of the terminal device in the first camped cell, the second network device determines (or selects), as the second paging parameter, one group of paging parameters from the plurality of groups of paging parameters in the first paging parameter.

In some feasible implementations, the first network device may send the second information to the terminal device via an RRC setup response message or the RRC paging information response message. It may be understood that, if the first information received by the first network device is included in the RRC setup request message, the first network device sends the second information to the terminal device via the RRC setup response message. If the first information received by the first network device is included in the RRC paging information request message, the first network device sends the second information to the terminal device via the RRC paging information response message.

In some other feasible implementations, if the first information received by the first network device is included in the MSGA, the first network device may send the second information to the terminal device via a MSGB. Optionally, if the first information received by the first network device is included in the MSG5 (namely, the RRC connection setup complete message), the first network device may send the second information to the terminal device via the RRC connection setup complete response message, an RRC connection reconfiguration (RRC Reconfiguration) message, or another RRC message.

In some feasible implementations, when the first identity module card of the terminal device is in the idle state or the inactive state in the first camped cell, the first network device may send the second information including the second paging parameter to the terminal device in a unicast or broadcast manner. If the first network device sends the second information to the terminal device in the unicast manner, a paging occasion of the terminal device that receives the second information in the first camped cell is changed. If the first network device sends the second information to the terminal device in the broadcast manner, paging occasions of a plurality of terminal devices in the idle state or the inactive state in the first camped cell are changed.

In some other feasible implementations, when the first identity module card of the terminal device is in the connected state in the first camped cell, it indicates that the terminal device has the dedicated channel resource in the first camped cell, and the first network device may send, in a unicast manner, the second information including the second paging parameter.

S304: The first network device sends a paging message on the second paging occasion determined based on the second paging parameter.

In some feasible implementations, the second paging parameter may be used to determine the second paging occasion of the first identity module card of the terminal device in the first camped cell. The first network device may determine the second paging occasion of the first identity module card of the terminal device in the first camped cell based on the second paging parameter and/or the broadcast fourth paging parameter. The first network device may send the paging message of the terminal device on the second paging occasion in the broadcast manner. The paging message may include the identity UE_ID of the terminal device.

It may be understood that, if the second paging parameter includes a parameter required for calculating the system frame number SFN in Formula (1-1) and a parameter required for calculating the paging occasion index $i\_s$ in Formula (1-2), the first network device may directly substitute the second paging parameter into Formula (1-1) and Formula (1-2) to calculate the first paging occasion of the first identity module card of the terminal device in the first camped cell. If the second paging parameter includes some parameters required for calculating the SFN or some parameters required for calculating $i\_s$, the first network device substitutes the second paging parameter and a parameter, other than a parameter of a type the same as that of the second paging parameter, in the fourth paging parameter into Formula (1-1) and Formula (1-2) to calculate the first paging occasion of the first identity module card of the terminal device in the first camped cell.

For example, it is assumed that the second paging parameter includes the paging frame offset and the total quantity of paging occasions in the paging frame, and the fourth paging parameter includes the paging frame offset, the DRX cycle value of the terminal device, the total quantity of paging frames in the DRX cycle, and the total quantity of paging occasions in the paging frame. Parameters that are in the fourth paging parameter and that are of types the same as those of the second paging parameter are the paging frame offset and the total quantity of paging occasions in the paging frame. The first network device may substitute the paging frame offset and the total quantity of paging occasions in the paging frame that are included in the second paging parameter and the DRX cycle value and the total quantity of paging frames in the DRX cycle that are included in the fourth paging parameter into Formula (1-1) and Formula (1-2) to calculate the second paging occasion.

Optionally, after obtaining the second paging parameter, the first network device may update the paging configuration of the system information of the first network device. Specifically, the first network device updates a paging parameter of the first identity module card of the terminal device in the first camped cell in the system information based on the second paging parameter. For example, it is assumed that the paging frame offset PF_offset included in the second paging parameter is 10, and in the fourth paging parameter, the PF_offset is 5, the DRX cycle value T of the terminal device is 300 milliseconds (ms), the total quantity N of paging frames in the cycle T is 64, and the total quantity Ns of paging occasions in the paging frame is 1. Before the paging configuration of the system information of the first network device is updated, the paging parameter of the first identity module card of the terminal device in the first camped cell in the system information is the fourth paging parameter. The first network device updates the paging frame offset PF_offset in the paging parameter of the first identity module card of the terminal device in the first camped cell in the system information to 10, and keeps other parameters unchanged, that is, the DRX cycle value T is 300 ms, the total quantity N of paging frames in the cycle T is 64, and the total quantity Ns of paging occasions in the paging frame is 1.

S305: The terminal device determines the second paging occasion based on the second paging parameter.

S306: The terminal device monitors the paging message in the first camped cell on the second paging occasion.

In some feasible implementations, after receiving the second information, the terminal device may extract the second paging parameter from the second information. The terminal device may determine the second paging occasion of the first identity module card of the terminal device in the first camped cell based on the second paging parameter and/or the fourth paging parameter.

For example, it is assumed that the second paging parameter includes the paging frame offset and the total quantity of paging occasions in the paging frame, and the fourth paging parameter includes the paging frame offset, the DRX cycle value of the terminal device, the total quantity of paging frames in the DRX cycle, and the total quantity of paging occasions in the paging frame. The terminal device may substitute the paging frame offset and the total quantity of paging occasions in the paging frame that are included in the second paging parameter and the DRX cycle value and the total quantity of paging frames in the DRX cycle that are in the fourth paging parameter into Formula (1-1) and Formula (1-2) to calculate the second paging occasion. For another example, assuming that the second paging parameter includes a paging frame PF or a paging occasion PO, an SFN determined based on the fourth paging parameter is 76, and i_s determined based on the fourth paging parameter is 0), the terminal device determines, as the second paging occasion, an (i_s+1)$^{th}$ PO (where i_s+1 is (+1=1) in the paging frame PF in the second paging parameter, or the terminal device determines, as the second paging occasion, a PO (where the PO is the PO included in the second paging parameter) of the SFN determined based on the fourth paging parameter.

In some feasible implementations, the paging message includes the identity UE_ID of the terminal device (where the UE_ID herein is the UE_ID of the first identity module card of the terminal device, namely, the UE_ID of the UE 1). The terminal device may monitor the paging message in the first camped cell on the second paging occasion. Optionally, the terminal device may further monitor the paging message in the second camped cell on the third paging occasion. The second paging occasion does not overlap the third paging occasion in terms of time. In this embodiment of this application, the terminal device actively requests to modify a paging parameter in a camped cell, so that two paging occasions that originally overlap in terms of time are staggered in terms of time, to avoid a paging collision. In this way, a terminal device carrying a plurality of identity module cards can successfully receive paging messages in two different camped cells.

Figure 6:
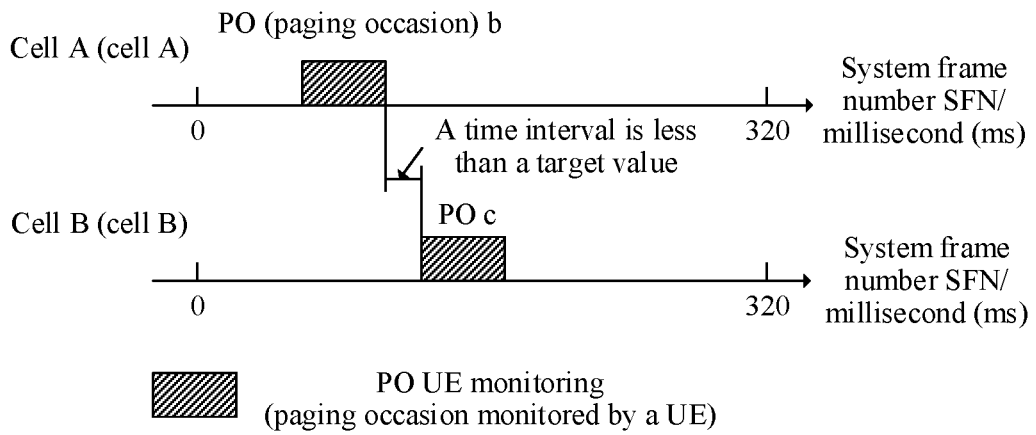
FIG. 6 is a schematic diagram of a relationship between a second paging occasion and a third paging occasion according to an embodiment of this application.

For example, FIG. 6 is a schematic diagram of a relationship between the second paging occasion and the third paging occasion according to an embodiment of this application. As shown in FIG. 6, the first camped cell is a cell A, and the second camped cell is a cell B. The second paging occasion is a PO b, and the third paging occasion is a PO c. The first paging occasion PO b does not overlap or collide with the second paging occasion PO c in terms of time, and a time interval between the PO b and the PO c is less than a target value. Optionally, if the first paging parameter is the same as the second paging parameter, the first paging occasion is the same as the second paging occasion.

Optionally, a manner in which the terminal device monitors the paging message in the first camped cell on the second paging occasion may be specifically as follows: The first identity module card (namely, the UE 1) of the terminal device wakes up on the second paging occasion, and monitors a PDCCH scrambled by using a paging radio network temporary identifier (paging-RNTI, P-RNTI) in the first camped cell. If the terminal device detects, on the second paging occasion, the PDCCH scrambled by using the P-RNTI, the terminal device reads each paging record in a paging record list, where the paging record includes an identity UE-identity of a paged UE. If the terminal device finds that the UE identity of the terminal device is consistent with a UE-identity in a paging record, the terminal device sends the UE-identity in the paging record and paging of a core network domain (cn-Domain) to an upper layer for further processing. If the terminal device does not find, in the paging record list, a UE-identity that is included in a paging record and that is consistent with the UE identity of the terminal device, the terminal device discards the received paging message, and enters a sleep state. Similarly, for a manner in which the terminal device monitors the paging message in the second camped cell on the third paging occasion, refer to the manner in which the terminal device monitors the paging message in the first camped cell on the second paging occasion. Details are not described herein again.

In some feasible implementations, a sequence of performing step S304 and steps S305 and S306 in this embodiment of this application is not limited. For example, step S304 may be performed before steps S305 and S306, step S304 may be performed after steps S305 and S306, or step S304 and steps S305 and S306 may be performed simultaneously.

In an optional embodiment, the terminal device sends the first information including the first paging parameter to the first network device corresponding to the first camped cell. Correspondingly, the first network device receives the first information. After receiving the first information, the first network device may determine the first paging occasion of the first identity module card of the terminal device in the first camped cell based on the first paging parameter in the first information, and may send a paging message on the first paging occasion. The terminal device monitors the paging message in the first camped cell on the first paging occasion determined based on the first paging parameter. It may be understood that, after the terminal device sends the first information including the first paging parameter, the first network device sends, by default, the paging message on the first paging occasion determined based on the first paging parameter. That is, the first network device does not need to reply to the first information with a response message. The first paging occasion does not overlap the third paging occasion of the second identity module card of the terminal device in the second camped cell in terms of time.

In some feasible implementations, after receiving the first information, the first network device may send an acknowledge (ACK) message to the terminal device. The acknowledge message may be used to acknowledge that the terminal device monitors the paging message in the first camped cell on the first paging occasion determined based on the first paging parameter. Information or data carried in the acknowledge message may be empty. The first network device determines the first paging occasion of the first identity module card of the terminal device in the first camped cell based on the first paging parameter in the first information, and may send the paging message on the first paging occasion. After receiving the ACK message, the terminal device may monitor the paging message in the first camped cell on the first paging occasion.

In some feasible implementations, the ACK message may be a media access control MAC control element (CE) message. After receiving the first information, the first network device may send the MAC CE message to the terminal device. The MAC CE message includes a UE 1D. The first network device determines the first paging occasion of the first identity module card of the terminal device in the first camped cell based on the first paging parameter in the first information, and may send the paging message on the first paging occasion. After receiving the MAC CE message, the terminal device may monitor the paging message in the first camped cell on the first paging occasion.

In another optional embodiment, before step S301, when the first identity module card of the terminal device is in the idle state or the inactive state in the first camped cell, the terminal device may perform random access to the first camped cell, so that a status of the first identity module card of the terminal device in the first camped cell is switched from the idle state or the inactive state to the connected state. After the status of the first identity module card of the terminal device in the first camped cell is switched to the connected state or an active state, the terminal device sends 1-bit data to the first network device corresponding to the first camped cell, where the 1-bit data may be used to remind the first network device that there is an uplink request message. In an embodiment, the 1-bit data may be sent via the MSG5. After receiving the 1-bit data, the first network device may send a UE information request message to the terminal device. The UE information request message may be used to schedule the terminal device. After the terminal device receives the UE information request message, step S301 may be: The terminal device sends the first information including the first paging parameter to the first network device via a UE information response message.

Figure 7:
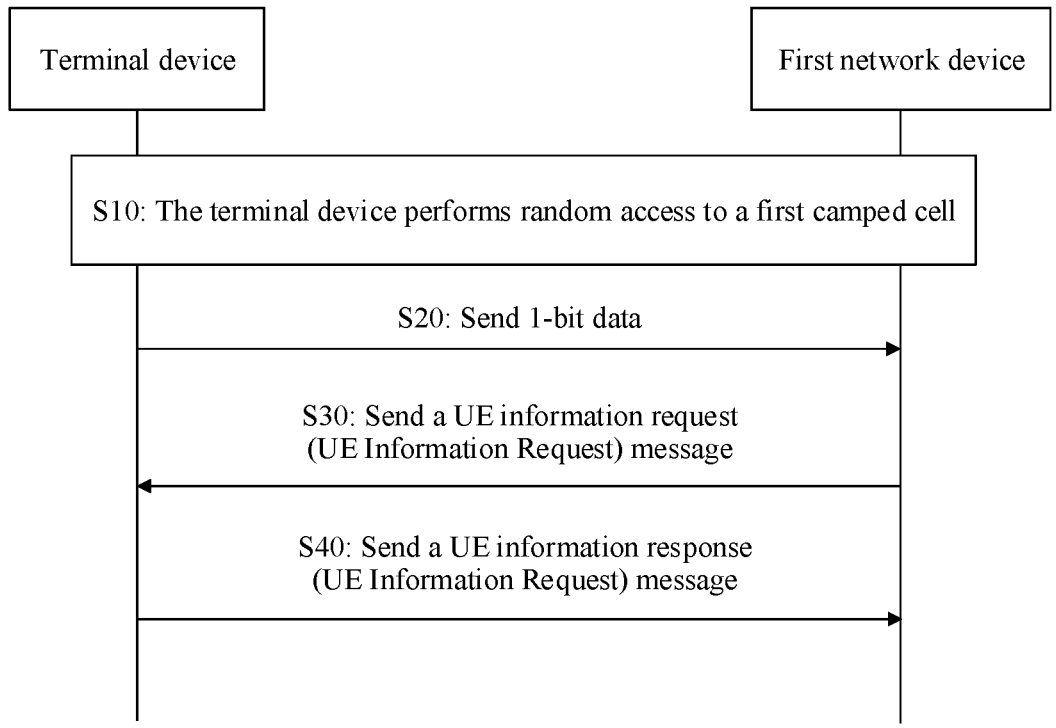
FIG. 7 is a flowchart of interaction between a terminal device and a first network device according to an embodiment of this application.

For example, FIG. 7 is a flowchart of interaction between the terminal device and the first network device according to an embodiment of this application. As shown in FIG. 7. S10: The terminal device performs random access to the first camped cell. S20: The terminal device sends the 1-bit data to the first network device corresponding to the first camped cell. S30: The first network device sends the UE information request message to the terminal device. S40: The terminal device sends the UE information request message to the first network device, where the UE information request message carries the first information including the first paging parameter.

Optionally, after receiving the UE information response message, the first network device may determine the first paging occasion of the first identity module card of the terminal device in the first camped cell based on the first paging parameter in the UE information response message, and may send a paging message on the first paging occasion. The terminal device monitors the paging message in the first camped cell on the first paging occasion determined based on the first paging parameter.

In still another optional embodiment, if the terminal device carries one identity module card, to save energy, the terminal device may alternatively send a recommended paging parameter to a network device corresponding to a cell on which the terminal device camps. After receiving the recommended paging parameter, the network device corresponding to the camped cell may send a paging message based on the recommended paging parameter. The terminal device may monitor the paging message on a paging occasion determined based on the recommended paging parameter. The recommended paging parameter may include one or more of the DRX cycle value T of the terminal device, the total quantity N of paging frames in the cycle T, or the total quantity Ns of paging occasions in the paging frame. For example, an original DRX cycle of the terminal device in the cell on which the terminal device camps is 100 ms, it indicates that the terminal device needs to wake up the terminal device once every 100 ms to monitor a paging message. To save energy, the paging parameter DRX cycle recommended by the terminal device is 500 ms, and it indicates that the terminal device expects to wake up the terminal device once every 500 ms to monitor the paging message.

In this embodiment of this application, when the terminal device carrying the plurality of identity module cards separately camps on two cells, and the terminal device detects a potential paging collision, the terminal device sends an expected paging parameter (namely, the first paging parameter) to the first network device corresponding to a camped cell (for example, the first camped cell) in the two cells on which the terminal device camps, and the first network device sends, to the terminal device, a paging parameter (namely, the second paging parameter) determined based on the expected paging parameter. The first network device sends a paging message on the paging occasion determined based on the second paging parameter, and the terminal device monitors the paging message in the first camped cell on the paging occasion determined based on the second paging parameter. The paging occasion determined based on the second paging parameter does not overlap a paging occasion of the terminal device in the other camped cell (namely, the second camped cell) in terms of time. In this embodiment of this application, a paging parameter of the terminal device in a camped cell is modified, so that two paging occasions that originally overlap in terms of time are staggered in terms of time, to avoid a paging collision. In this way, the terminal device carrying the plurality of identity module cards can successfully receive paging messages in two different camped cells.

The paging collision processing method in embodiments of this application is described in detail above. To better implement the foregoing solutions in embodiments of this application, embodiments of this application further provide a corresponding apparatus or device.

Figure 8:
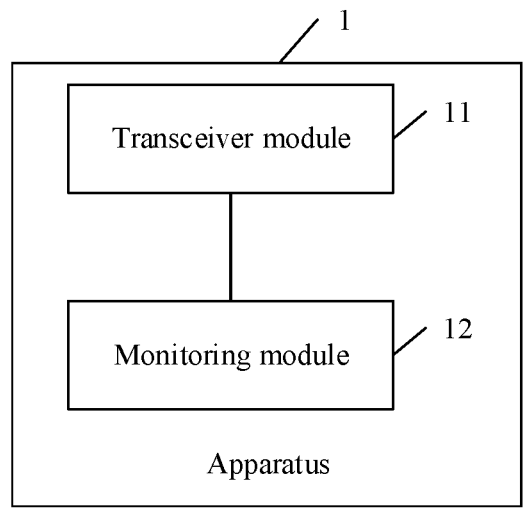
FIG. 8 is a schematic diagram of a structure of an apparatus according to an embodiment of this application.

FIG. 8 is a schematic diagram of a structure of an apparatus according to an embodiment of this application. The apparatus may be a terminal device or a chip or a circuit that may be disposed in the terminal device. As shown in FIG. 8, the apparatus 1 may include:

a transceiver module 11, configured to send first information including a first paging parameter, and receive second information including a second paging parameter; and a monitoring module 12, configured to monitor a paging message in a first camped cell on a second paging occasion determined based on the second paging parameter, where the second paging parameter may be determined based on the first paging parameter, the second paging parameter is used to determine the second paging occasion of a first identity module card of the apparatus 1 in the first camped cell, and the second paging occasion may not overlap a third paging occasion of a second identity module card of the apparatus 1 in a second camped cell in terms of time.

In some feasible implementations, the second paging parameter may be the same as the first paging parameter.

In some feasible implementations, the first paging parameter is used to determine a first paging occasion of the first identity module card of the apparatus 1 in the first camped cell, and the first paging occasion may not overlap the third paging occasion in terms of time. Optionally, when the first paging parameter is the same as the second paging parameter, the first paging occasion is also the same as the second paging occasion.

In some feasible implementations, the transceiver module 11 is specifically configured to send an RRC message including the first information. The RRC message may be a MSG3 or a MSG5. The MSG3 may be an RRC setup request message or a newly defined RRC message, for example, an RRC paging information request message. The MSG5 may be an RRC connection setup complete message.

In some feasible implementations, the transceiver module 11 is further configured to: receive a random access resource indication, where the random access resource indication is used to indicate a random access resource, and the random access resource includes one or more random access sequences; and send a first random access sequence in the one or more random access sequences, where the first random access sequence is used to indicate that the apparatus 1 needs to transmit a paging parameter.

In some feasible implementations, the transceiver module 11 is further configured to: receive a random access resource indication, where the random access resource indication is used to indicate a random access resource, and the random access resource includes a time-frequency resource; and send a second random access sequence on the time-frequency resource, where the time-frequency resource is used to indicate that the apparatus 1 needs to transmit a paging parameter.

In some feasible implementations, the first information may further include an identity UE_ID of the terminal device.

In some feasible implementations, the first paging parameter and the second paging parameter each may include one or more of the following paging parameters: a paging frame offset PF_offset, a paging occasion index i_s, a paging frame PF, a paging occasion PO, or a total quantity Ns of paging occasions in one paging frame.

The monitoring module 12 may be a processing module.

During specific implementation, for implementation of each module or unit, correspondingly refer to corresponding descriptions of the terminal device in the embodiment shown in FIG. 3, FIG. 5, or FIG. 7, to perform the method and the function performed by the terminal device in the foregoing embodiment.

The apparatus 1 (the terminal device) in this embodiment of this application actively requests to modify a paging parameter in a camped cell, so that two paging occasions that originally overlap in terms of time are staggered in terms of time, to avoid a paging collision. In this way, a terminal device carrying a plurality of identity module cards can successfully receive paging messages in two different camped cells.

Figure 9:
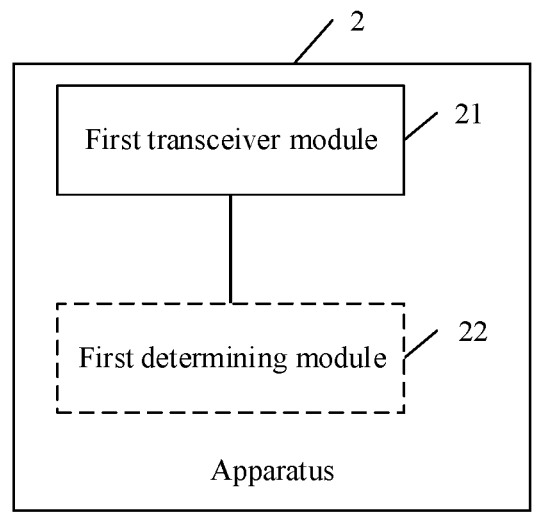
FIG. 9 is another schematic diagram of a structure of an apparatus according to an embodiment of this application.

FIG. 9 is another schematic diagram of a structure of an apparatus according to an embodiment of this application. The apparatus may be a first network device or a chip or a circuit that may be disposed in the first network device. The first network device may be a DU. As shown in FIG. 9, the apparatus 2 may include:

a first transceiver module 21, configured to: receive first information of a terminal device, send second information including a second paging parameter, and send a paging message on a second paging occasion determined based on the second paging parameter, where the first information includes a first paging parameter, the second paging parameter may be determined based on the first paging parameter, the second paging parameter is used to determine the second paging occasion of a first identity module card of the terminal device in a first camped cell, and the second paging occasion may not overlap a third paging occasion of a second identity module card of the terminal device in a second camped cell in terms of time.

In some feasible implementations, the second paging parameter may be the same as the first paging parameter.

In some feasible implementations, the first paging parameter is used to determine a first paging occasion of the first identity module card of the terminal device in the first camped cell, and the first paging occasion may not overlap the third paging occasion in terms of time. Optionally, when the first paging parameter is the same as the second paging parameter, the first paging occasion is also the same as the third paging occasion.

In some feasible implementations, the first transceiver module 21 is specifically configured to receive an RRC message including the first information of the terminal device. The RRC message may be a MSG3 or a MSG5. The MSG3 may be an RRC setup request message or a newly defined RRC message, for example, an RRC paging information request message. The MSG5 may be an RRC connection setup complete message.

In some feasible implementations, the first transceiver module 21 is further configured to: send a random access resource indication, where the random access resource indication is used to indicate a random access resource, and the random access resource includes one or more random access sequences; and receive a first random access sequence in the one or more random access sequences, where the first random access sequence is used to indicate that the terminal device needs to transmit a paging parameter.

In some feasible implementations, the first transceiver module 21 is further configured to: send a random access resource indication, where the random access resource indication is used to indicate a random access resource, and the random access resource includes a time-frequency resource; and receive a second random access sequence on the time-frequency resource, where the time-frequency resource is used to indicate that the terminal device needs to transmit a paging parameter.

In some feasible implementations, the apparatus 2 further includes a first determining module 22. The first determining module 22 is configured to determine the second paging parameter based on the first paging parameter. Optionally, the first determining module 22 is specifically configured to determine the first paging parameter as the second paging parameter. That is, the first paging parameter is the same as the second paging parameter. In another optional manner, if the first paging parameter includes a plurality of groups of paging parameters, the first determining module 22 is specifically configured to select/determine, as the second paging parameter, one group of paging parameters from/in the plurality of groups of paging parameters in the first paging parameter.

In some feasible implementations, the first transceiver module 21 is further configured to: send a first message to a second network device, where the first message carries the first information; and receive a second message from the second network device, where the second message includes the second paging parameter.

In some feasible implementations, the first information may further include an identity UE_ID of the terminal device.

In some feasible implementations, the first paging parameter and the second paging parameter each may include one or more of the following paging parameters: a paging frame offset PF_offset, a paging occasion index i_s, a paging frame PF, a paging occasion PO, or a total quantity Ns of paging occasions in one paging frame.

The first determining module 22 may be a processing module.

During specific implementation, for implementation of each module or unit, correspondingly refer to corresponding descriptions of the first network device in the embodiment shown in FIG. 3, FIG. 5, or FIG. 7, to perform the method and the function performed by the first network device in the foregoing embodiment.

After receiving information (namely, the first information) for requesting to modify a paging parameter from the terminal device, the apparatus 2 (the first network device) in this embodiment of this application re-determines a paging parameter of the terminal device in a camped cell, so that two paging occasions that originally overlap in terms of time are staggered in terms of time, to avoid a paging collision. In this way, a terminal device carrying a plurality of identity module cards can successfully receive paging messages in two different camped cells.

Figure 10:
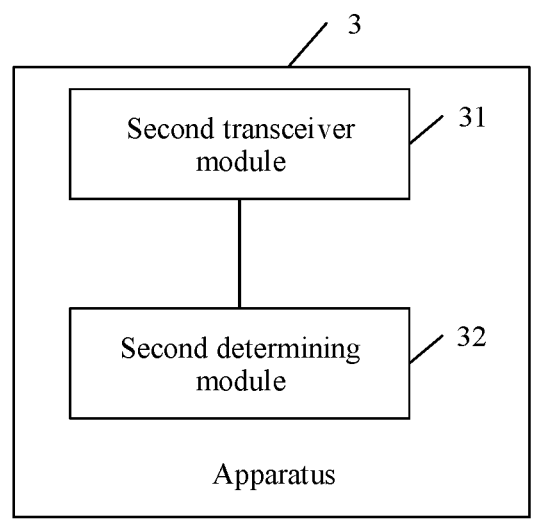
FIG. 10 is still another schematic diagram of a structure of an apparatus according to an embodiment of this application.

FIG. 10 is still another schematic diagram of a structure of an apparatus according to an embodiment of this application. The apparatus may be a second network device or a chip or a circuit that may be disposed in the second network device. The second network device may be a CU. As shown in FIG. 10, the apparatus 3 may include:
a second transceiver module 31, configured to receive a first message from a first network device, where the first message carries first information, and the first information includes a first paging parameter; and a second determining module 32, configured to determine a second paging parameter based on the first paging parameter, where the second transceiver module 31 is further configured to send a second message to the first network device, where the second message includes the second paging parameter, where the second paging parameter is used to determine a second paging occasion of a first identity module card of a terminal device in a first camped cell, and the second paging occasion may not overlap a third paging occasion of a second identity module card of the terminal device in a second camped cell in terms of time.

The second determining module 32 may be a processing module.

During specific implementation, for implementation of each module or unit, correspondingly refer to corresponding descriptions of the second network device in the embodiment shown in FIG. 5, to perform the method and the function performed by the second network device in the foregoing embodiment.

Figure 11:
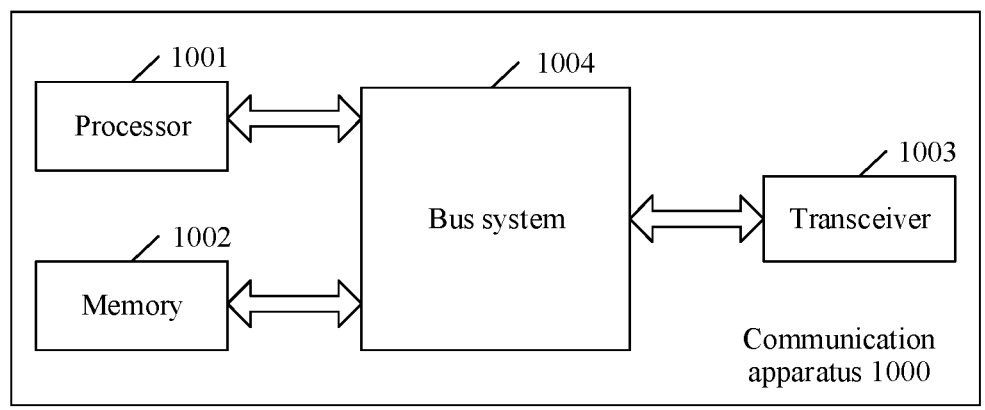
FIG. 11 is a schematic diagram of a structure of a communication apparatus according to an embodiment of this application.

FIG. 11 is a schematic diagram of a structure of a communication apparatus according to an embodiment of this application. As shown in FIG. 11, the communication apparatus 1000 provided in this embodiment of this application includes a processor 1001, a memory 1002, a transceiver 1003, and a bus system 1004. The communication apparatus provided in this embodiment of this application may be any one of a terminal device, a first network device, and a second network device.

The processor 1001, the memory 1002, and the transceiver 1003 are connected by using the bus system 1004.

The memory 1002 is configured to store a program. Specifically, the program may include program code, and the program code includes computer operation instructions. The memory 1002 includes but is not limited to a random access memory (random access memory, RAM), a read-only memory (ROM), an erasable programmable read-only memory (EPROM), or a compact disc read-only memory (CD-ROM). Only one memory is shown in FIG. 11. Certainly, a plurality of memories may be disposed as required. The memory 1002 may alternatively be a memory in the processor 1001. This is not limited herein.

The memory 1002 stores the following elements, executable units or data structures, or subsets or extended sets thereof:
operation instructions, including various operation instructions and used to implement various operations; and
an operating system, including various system programs, used to implement various basic services and process a hardware-based task.

The processor 1001 controls an operation of the communication apparatus 1000. The processor 1001 may be one or more central processing units (CPU). When the processor 1001 is one CPU, the CPU may be a single-core CPU, or may be a multi-core CPU.

During specific application, components of the communication apparatus 1000 are coupled together by using the bus system 1004. In addition to a data bus, the bus system 1004 may further include a power bus, a control bus, a status signal bus, and the like. However, for clear description, various buses in FIG. 11 are marked as the bus system 1004. For ease of illustration, FIG. 11 shows merely an example of the bus system 1004.

Any one of FIG. 3, FIG. 5, or FIG. 7 provided in the foregoing embodiments of this application or the method of the terminal device disclosed in the foregoing embodiments, any one of FIG. 3, FIG. 5, or FIG. 7 provided in the foregoing embodiments of this application or the method of the first network device in the foregoing embodiments, or FIG. 5 provided in the foregoing embodiment of this application or the method of the second network device in the foregoing embodiments may be applied to the processor 1001, or may be implemented by the processor 1001. The processor 1001 may be an integrated circuit chip with a signal processing capability. In an implementation process, each step in the foregoing method may be completed by using an integrated logic circuit of hardware in the processor 1001 or instructions in a form of software. The foregoing processor 1001 may be a general-purpose processor, a digital signal processor (DSP), an application specific integrated circuit (ASIC), a field-programmable gate array (FPGA) or another programmable logic device, a discrete gate or a transistor logic device, or a discrete hardware component. The processor 1001 may implement or perform the method, steps, and logical block diagrams that are disclosed in embodiments of this application. The general-purpose processor may be a microprocessor, or the processor may be any conventional processor or the like. Steps of the method disclosed with reference to embodiments of this application may be directly performed and completed by using a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1002. The processor 1001 reads information in the memory 1002, and performs, in combination with hardware of the processor 1001, the steps of the method of the terminal device described in any one of FIG. 3, FIG. 5, or FIG. 7, performs, in combination with hardware of the processor 1001, the steps of the method of the first network device described in any one of FIG. 3, FIG. 5, or FIG. 7, or performs, in combination with hardware of the processor 1001, the steps of the method of the second network device described in FIG. 5.

An embodiment of this application further provides a computer program product. The computer program product includes computer program code. When the computer program code is run on a computer, the computer is enabled to perform the steps of the method of the terminal device described in FIG. 3, FIG. 5, or FIG. 7: when the computer program code is run on a computer, the computer is enabled to perform the steps of the method of the first network device described in FIG. 3, FIG. 5, or FIG. 7: or when the computer program code is run on a computer, the computer is enabled to perform the steps of the method of the second network device described in FIG. 5.

An embodiment of this application further provides an apparatus. The apparatus may be a chip. The chip includes a processor. The processor is configured to read and execute a computer program stored in a memory, to perform the paging collision processing method in any possible implementation in FIG. 3, FIG. 5, or FIG. 7. Optionally, the chip further includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

In another embodiment of this application, a communication system is further provided. The communication system includes a terminal device and a first network device. Alternatively, the communication system includes a terminal device, a first network device, and a second network device. For example, the terminal device may be the terminal device in the paging collision processing method provided in FIG. 3 or the embodiment shown in FIG. 5 or FIG. 7, and the first network device may be the first network device in the paging collision processing method provided in FIG. 3 or the embodiment shown in FIG. 5 or FIG. 7. Alternatively, the terminal device may be the terminal device in the paging collision processing method provided in FIG. 3 or the embodiment shown in FIG. 5 or FIG. 7, and the first network device may be the first network device in the paging collision processing method provided in FIG. 3 or the embodiment shown in FIG. 5 or FIG. 7, and the second network device may be the second network device in the paging collision processing method provided in FIG. 3 or the embodiment shown in FIG. 5.

A person of ordinary skill in the art may understand that all or some of the procedures of the methods in embodiments may be implemented by a computer program instructing related hardware. The program may be stored in a computer-readable storage medium. When the program is executed, the procedures of the method embodiments may be performed. The foregoing storage medium includes any medium that can store program code, such as a ROM, a random access memory RAM, a magnetic disk, or an optical disc.

The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A paging collision processing method comprising:
   sending, by a terminal device, first information, wherein the first information comprises a first paging parameter;
   receiving, by the terminal device, second information, wherein the second information comprises a second paging parameter, which is determined based on the first paging parameter, and is used to determine a second paging occasion of a first identity module card of the terminal device in a first camped cell,
      wherein the second paging occasion does not overlap a third paging occasion of a second identity module card of the terminal device in a second camped cell in terms of time; and
   monitoring, by the terminal device, a paging message in the first camped cell on the second paging occasion.

2. The method according to claim 1, wherein the second paging parameter is the same as the first paging parameter.

3. The method according to claim 1, wherein the first paging parameter is used to determine a first paging occasion of the first identity module card of the terminal device in the first camped cell, and the first paging occasion does not overlap the third paging occasion in terms of time.

4. The method according to claim 1, wherein the sending the first information comprises:
   sending, by the terminal device, a radio resource control (RRC) message comprising the first information.

5. The method according to claim 4, wherein before sending the RRC message comprising the first information, the method further comprises:
   receiving, by the terminal device, a random access resource indication, wherein the random access resource indication indicates a random access resource, and the random access resource comprises one or more random access sequences; and
   sending, by the terminal device, a first random access sequence in the one or more random access sequences, wherein the first random access sequence indicates that the terminal device needs to transmit a paging parameter.

6. The method according to claim 4, wherein before sending the RRC message comprising the first information, the method further comprises:
  receiving, by the terminal device, a random access resource indication, wherein the random access resource indication indicates a random access resource, and the random access resource comprises a time-frequency resource; and
  sending, by the terminal device, a second random access sequence on the time-frequency resource, wherein the time-frequency resource indicates that the terminal device needs to transmit a paging parameter.

7. The method according to claim 1, wherein the first information further comprises an identity of the terminal device.

8. The method according to claim 1, wherein the first paging parameter and the second paging parameter each comprise one or more of the following paging parameters;
  a paging frame offset (PF_offset), a paging occasion index i_s, a paging frame (PF), a paging occasion (PO), or a total quantity of paging occasions in one paging frame.

9. A paging collision processing method comprising:
  receiving, by a first network device, first information of a terminal device, wherein the first information comprises a first paging parameter;
  sending, by the first network device, second information, wherein the second information comprises a second paging parameter, which is determined based on the first paging parameter, and is used to determine a second paging occasion of a first identity module card of the terminal device in a first camped cell,
    wherein the second paging occasion does not overlap a third paging occasion of a second identity module card of the terminal device in a second camped cell in terms of time; and
  sending, by the first network device, a paging message on the second paging occasion.

10. The method according to claim 9, wherein the second paging parameter is the same as the first paging parameter.

11. The method according to claim 9, wherein the first paging parameter is used to determine a first paging occasion of the first identity module card of the terminal device in the first camped cell, and the first paging occasion does not overlap the third paging occasion in terms of time.

12. The method according to claim 9, wherein the receiving the first information of the terminal device comprises:
  receiving, by the first network device, a radio resource control (RRC) message comprising the first information of the terminal device.

13. The method according to claim 12, wherein before the receiving the RRC message comprising the first information of the terminal device, the method further comprises:
  sending, by the first network device, a random access resource indication, wherein the random access resource indication indicates a random access resource, and the random access resource comprises one or more random access sequences; and
  receiving, by the first network device, a first random access sequence in the one or more random access sequences, wherein the first random access sequence indicates that the terminal device needs to transmit a paging parameter.

14. The method according to claim 12, wherein before the receiving the RRC message comprising the first information of the terminal device, the method further comprises:
  sending, by the first network device, a random access resource indication, wherein the random access resource indication indicates a random access resource, and the random access resource comprises a time-frequency resource; and
  receiving, by the first network device, a second random access sequence on the time-frequency resource, wherein the time-frequency resource indicates that the terminal device needs to transmit a paging parameter.

15. The method according to claim 9, wherein before sending the second information, the method further comprises:
  sending, by the first network device, a first message to a second network device, wherein the first message carries the first information; and
  receiving, by the first network device, a second message from the second network device, wherein the second message comprises the second paging parameter.

16. The method according to claim 9, wherein the first information further comprises an identity of the terminal device.

17. The method according to claim 9, wherein the first paging parameter and the second paging parameter each comprise one or more of the following paging parameters;
  a paging frame offset (PF_offset), a paging occasion index i_s, a paging frame (PF), a paging occasion (PO), or a total quantity of paging occasions in one paging frame.

18. An apparatus comprising:
  a processor; and
  a non-transitory memory coupled to the processor and having computer-executable instructions stored thereon, which are executed by the processor and cause the apparatus to implement a paging collision processing method comprising:
  sending first information to a network device, wherein the first information comprises a first paging parameter;
  receiving second information from the network device, wherein the second information comprises a second paging parameter, which is determined based on the first paging parameter, and is used to determine a second paging occasion of a first identity module card of the apparatus in a first camped cell,
    wherein the second paging occasion does not overlap a third paging occasion of a second identity module card of the apparatus in a second camped cell in terms of time; and
  monitoring, a paging message in the first camped cell on the second paging occasion.

19. The apparatus according to claim 18, wherein the second paging parameter is the same as the first paging parameter.

20. The apparatus according to claim 18, wherein the first paging parameter is used to determine a first paging occasion of the first identity module card of the apparatus in the first camped cell, and the first paging occasion does not overlap the third paging occasion in terms of time.

* * * * *

UNITED STATES PATENT AND TRADEMARK OFFICE
CERTIFICATE OF CORRECTION

PATENT NO. : 12,219,525 B2
APPLICATION NO. : 17/845571
DATED : February 4, 2025
INVENTOR(S) : Han et al.

Page 1 of 1

It is certified that error appears in the above-identified patent and that said Letters Patent is hereby corrected as shown below:

In the Claims

Claim 8: Column 33, Line 21: "comprise one or more of the following paging parameters;" should read as -- comprise one or more of the following paging parameters: --.

Claim 17: Column 34, Line 30: "comprise one or more of the following paging parameters;" should read as -- comprise one or more of the following paging parameters: --.

Signed and Sealed this
Twenty-second Day of July, 2025

Coke Morgan Stewart
*Acting Director of the United States Patent and Trademark Office*